US012571112B2

(12) United States Patent
Macfarlane et al.

(10) Patent No.: US 12,571,112 B2
(45) Date of Patent: Mar. 10, 2026

(54) METHOD OF CONTINUOUS ELECTROCHEMICAL DINITROGEN REDUCTION

(71) Applicant: MONASH UNIVERSITY, Clayton (AU)

(72) Inventors: Douglas R. Macfarlane, Clayton (AU); Alexandr Nikolaevich Simonov, Clayton (AU); Bryan Harry Rahmat Suryanto, Clayton (AU); Karolina Matuszek, Clayton (AU); Pavel Cherepanov, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 99 days.

(21) Appl. No.: 18/006,297

(22) PCT Filed: Jul. 30, 2021

(86) PCT No.: PCT/AU2021/050833

§ 371 (c)(1),
(2) Date: Jan. 20, 2023

(87) PCT Pub. No.: WO2022/020904

PCT Pub. Date: Feb. 3, 2022

(65) Prior Publication Data

US 2023/0272541 A1 Aug. 31, 2023

(30) Foreign Application Priority Data

Jul. 31, 2020 (AU) ................................ 2020902696
Jun. 10, 2021 (AU) ................................ 2021901750

(51) Int. Cl.
*C25B 1/27* (2021.01)
*C01C 1/02* (2006.01)
(Continued)

(52) U.S. Cl.
CPC ................ *C25B 1/27* (2021.01); *C01C 1/026* (2013.01); *C25B 1/50* (2021.01); *C25B 9/05* (2021.01);
(Continued)

(58) Field of Classification Search
CPC ................ C25B 1/27; C25B 1/00; C25B 1/50
See application file for complete search history.

(56) References Cited

U.S. PATENT DOCUMENTS

2021/0285113 A1* 9/2021 Schmid .................. C01B 21/06

FOREIGN PATENT DOCUMENTS

CN 106661740 A 5/2017
CN 110869319 A 3/2020
(Continued)

OTHER PUBLICATIONS

Zhou et al. ("Electro-synthesis of ammonia from nitrogen at ambient temperature and pressure in ionic liquids†" Energy Environ. Sci., 2017, 10, 2516-2520 and S1-S12) (Year: 2017).*
(Continued)

*Primary Examiner* — Luan V Van
*Assistant Examiner* — Alexander R. Parent
(74) *Attorney, Agent, or Firm* — Norris McLaughlin, PA

(57) ABSTRACT

The invention provides a method of continuous electrochemical dinitrogen reduction to produce ammonia, the method comprising: supplying dinitrogen to an electrochemical cell comprising an electrolyte in contact with at least a cathode; introducing protons to the electrolyte by anodic oxidation of a hydrogen-containing species; and cathodically reducing the dinitrogen in the presence of a metal selected from lithium, magnesium, calcium, strontium, barium, zinc, aluminium and vanadium to produce ammonia, wherein the electrolyte comprises a cationic proton carrier capable of reversible deprotonation to form a neutral proton acceptor, wherein the neutral proton acceptor is an ylide.

18 Claims, 6 Drawing Sheets

(51) Int. Cl.

| | |
|---|---|
| ***C25B 1/50*** | (2021.01) |
| ***C25B 9/05*** | (2021.01) |
| ***C25B 9/19*** | (2021.01) |
| ***C25B 15/029*** | (2021.01) |
| ***C25B 15/08*** | (2006.01) |

(52) U.S. Cl.
CPC .............. *C25B 9/19* (2021.01); *C25B 15/029* (2021.01); *C25B 15/087* (2021.01)

(56) References Cited

FOREIGN PATENT DOCUMENTS

| | | | | | |
|---|---|---|---|---|---|
| DE | 102018210304 | A1 * | 1/2020 | | C25B 15/08 |
| WO | 2017132721 | A1 | 8/2017 | | |
| WO | WO-2019018875 | A1 * | 1/2019 | | C25B 1/27 |

OTHER PUBLICATIONS

Tsuneto et al. "Lithium-mediated electrochemical reduction of high pressure N2 to NH3" Journal of Electroanalytical Chemistry, 367 (1994) 183-188 (Year: 1994).*

TCI "Safety Data Sheet: 1H, 1H,5H-Octafluoropentyl 1,1,2,2-Tetrafluoroethyl Ether" 2024 (Year: 2024).*

Suryanto et al. "Nitrogen reduction to ammonia at high efficiency and rates based on a phophonium proton shuttle" Science 372 (2021) 1187 (Year: 2021).*

International Search Report for corresponding application PCT/AU2021/050833 dated Sep. 30, 2021.

Newton, T., "Nucleophilic Addition IV", [retrieved from internet on Mar. 14, 2020].<URL: http://wwwl .biologie.uni-hamburg.de/bonline/library/newton/Chy251 253/Lectures/Nucleophilic Addition III/NucleophilicAdditionIIIA.html> published Sep. 24, 2002 as per Wayback Machine Scheme 2.

CN First Office Action and English translation in corresponding application CN 202180066981.8 dated Aug. 12, 2025.

* cited by examiner

METHOD OF CONTINUOUS ELECTROCHEMICAL DINITROGEN REDUCTION

This is an application filed under 35 USC 371 based on PCT/AU2021/050833 filed 30 Jul. 2021, which claimed priority to AU 2020902696 filed 31 Jul. 2020 and AU 2021901750 filed 10 Jun. 2021. The present application claims the full priority benefit of all prior applications and incorporates by reference their full disclosures as if set forth herein.

TECHNICAL FIELD

The invention relates to a method of continuous electrochemical dinitrogen reduction to produce ammonia. The method includes supplying dinitrogen to an electrochemical cell comprising an electrolyte in contact with at least a cathode, introducing protons to the electrolyte by anodic oxidation of a hydrogen-containing species, and cathodically reducing the dinitrogen in the presence of certain metals to produce ammonia. The electrolyte comprises a cationic proton carrier capable of reversible deprotonation to form an ylide proton acceptor. The invention also relates to a liquid electrolyte for an electrochemical reduction reaction, to use of the electrolyte for a reduction reaction in an electrochemical cell, and to a system for continuous electrochemical reduction reactions including the electrolyte in an electrochemical cell.

BACKGROUND OF INVENTION

Providing food and energy sufficient to meet the requirements of a burgeoning world population remains an ongoing challenge for humanity. New technologies for dinitrogen ($N_2$) fixation to form ammonia ($NH_3$) offer potential solutions to both of these challenges: synthetic ammonia-based fertilizers are already critical to global food production and the high energy density of $NH_3$ provides a significant prospect for its use as a transportable fuel or carrier of renewable energy.

The invention of the Haber-Bosch process in the 20th century provided for the first time an industrial route to produce large volumes of synthetic ammonia. However, due to the exceptional stability of the dinitrogen triple bond (N≡N, 942 kJ $mol^{-1}$), the Haber-Bosch process requires extreme reaction conditions of elevated pressure (150-350 atm) and temperature (400-5500° C.), as well as a supply of pure $H_2$ which is typically sourced from the steam reforming process of natural gas. Consequently, the process consumes approximately 2% of global energy supply and contributes ~1.5% of global greenhouse gas emissions. Technologies for $N_2$ conversion to $NH_3$ which can be powered by renewable resources are thus urgently needed.

The development of a successful electrochemical nitrogen reduction reaction (NRR) process would enable the direct conversion of renewable electricity into $NH_3$ in a simple electrolytic cell. The cathodic half-reaction of the NRR is shown in equation (1):

$$N_2+6H^++6e^-\rightarrow 2NH_3 \quad (1)$$

Instead of relying on steam reformed $H_2$, the protons required for NRR can be supplied by anodic oxidation of water (the oxygen evolution reaction) or $H_2$ generated from sustainable water-splitting processes. Unfortunately, the $6e^-$ and $6H^+$ NRR is kinetically sluggish and thus electrochemically disadvantaged over the more facile $2e^-$ and $2H^+$ hydrogen evolution reaction (HER) shown in equation (2). As a result of competition from the HER, many reported electrochemical syntheses of $NH_3$ suffer both from very low faradaic efficiency and/or low $NH_3$ yield rates.

$$2H^++2e^-\rightarrow H_2 \quad (2)$$

One approach to address this issue is disclosed in DE102018210304, wherein suitable metals including lithium, magnesium, calcium, strontium, barium, zinc, aluminium, and vanadium are used to form the corresponding nitride. The metal in its metallic form is first formed, preferably in its liquid state by electrolysis of a metal ion containing molten salt at elevated temperatures, and then reacted with $N_2$ to form the metal nitride. Once formation of the nitride is complete, it is separated and introduced into the anode compartment of an electrochemical cell where protons are produced, ultimately producing ammonia. The need to manipulate the metal nitride compound between separate process environments creates a complex multistep process which is capital intensive in terms of equipment and energy inefficient.

Another approach previously developed, for example as reported by Tsuneto et al, Chemistry Letters 1993, 851-854, is the continuous lithium-mediated electrochemical ammonia synthesis. In a typical continuous Li-mediated electrochemical $NH_3$ synthesis reaction, the electrolyte system includes Li salts such as lithium triflate (LiOtf), lithium perchlorate ($LiClO_4$) or lithium tetrafluoroborate ($LiBF_4$) and a proton carrier (or proton donor) in an organic solvent such as tetrahydrofuran. The proposed mechanism for this reaction is shown in FIG. 1, for the case where the source of protons is anodic $H_2$ oxidation. At cathode 102, lithium cations ($Li^+$) are reduced to metallic lithium (Li), which spontaneously reacts with dinitrogen ($N_2$) to form lithium nitride ($Li_3N$). The $Li_3N$ is then protonated by the proton carrier (BH) present in the electrolyte to produce ammonia and a deprotonated proton carrier (B), and regenerate the lithium cations. At anode 104, protons ($H^+$) are produced by anodic oxidation of $H_2$; these protons protonate B in the electrolyte to regenerate the proton carrier (BH) and thus complete the reaction cycle. Since the protons are only indirectly involved in the nitrogen reduction reaction, it is expected that competition from the HER can be minimised.

The proton carrier molecule (BH) should be reactive with $Li_3N$ to produce $NH_3$, but ideally only weakly acidic in order to diminish the rate of competitive proton reduction to dihydrogen and/or hydride. The most common proton carrier currently used for this process is ethanol and similar alcohols (e.g. methanol, isopropyl alcohol). Thus, the proton carrier (BH) is typically a neutral species such as $CH_3CH_2OH$ while its deprotonated form B is an anionic species such as $CH_3CH_2O^-$. Water is generally unsuitable as proton carrier due to its high acidity and the reducibility of water to $H_2$ at more positive potentials than $Li^+$ reduction to Li.

A significant challenge with the lithium-mediated electrochemical synthesis reaction is the effective regeneration of ethanol or other alcohol proton carriers, which has never been experimentally validated. If the alcohol, which is generally more expensive than ammonia, is not fully recycled then it is uneconomically consumed as a proton source in the synthesis. The anodic decomposition of alcohols is recognised as a parasitic process that can contribute to ethanol consumption in the cell.

Another issue is the formation of insoluble by-products following deprotonation of the proton carrier at the cathode, formed by precipitation of the anionic species with $Li^+$ as insoluble salts. Deposition of these materials can cause a rapid increase in the internal resistance of the cell, and thus the cell voltage required to drive the desired reaction. The anion generated by deprotonation of alcohols such as ethanol is a very strong base and will interact strongly with $Li^+$ cations to produce a low solubility salt.

There is therefore an ongoing need for new methods of continuous electrochemical dinitrogen reduction to produce ammonia which at least partially address one or more of the above-mentioned short-comings, or provide a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

In accordance with a first aspect the invention provides a method of continuous electrochemical dinitrogen reduction to produce ammonia, the method comprising: supplying dinitrogen to an electrochemical cell comprising an electrolyte in contact with at least a cathode; introducing protons to the electrolyte by anodic oxidation of a hydrogen-containing species; and cathodically reducing the dinitrogen in the presence of a metal selected from lithium, magnesium, calcium, strontium, barium, zinc, aluminium and vanadium to produce ammonia, wherein the electrolyte comprises a cationic proton carrier capable of reversible deprotonation to form a neutral proton acceptor, wherein the neutral proton acceptor is an ylide.

In some embodiments, cathodically reducing the dinitrogen comprises reacting the dinitrogen and the cationic proton carrier to produce the ammonia and form the neutral proton acceptor. The cationic proton carrier may then be regenerated in the electrolyte by protonating the neutral proton acceptor with the protons.

Reacting the dinitrogen and the cationic proton carrier may comprise (i) reacting the dinitrogen and the metal to form a metal nitride; and (ii) reacting the metal nitride with the cationic proton carrier to produce the ammonia and form the neutral proton acceptor.

In some embodiment, the metal is present as metal cations in the electrolyte.

In some embodiments, the metal is lithium.

In some embodiments, the ylide comprises a carbanion adjacent to a cationic heteroatom selected from the group consisting of phosphorous, nitrogen, sulfur and oxygen.

In some embodiments, the neutral proton acceptor is selected from a phosphonium ylide and a sulfonium ylide. In some embodiments, the neutral proton acceptor is a phosphonium ylide.

In some embodiments, the cationic proton carrier is selected from an alkyl phosphonium cation and an alkyl sulfonium cation. In some embodiments, the cationic proton carrier is an alkyl phosphonium cation. The alkyl phosphonium cation may be a tetra-alkyl phosphonium cation, for example of the form $[PR^6R^7R^8R^9]^+$ wherein $R^6$, $R^7$, $R^8$ and $R^9$ are independently selected from $C_1$-$C_{20}$ n-alkyl.

In some embodiments, the cationic proton carrier is capable of deprotonation to form the neutral proton acceptor when contacted with lithium nitride.

In some embodiments, the electrolyte is a nonaqueous liquid electrolyte. The nonaqueous liquid electrolyte may comprise one or more molecular solvents. The molecular solvent(s) may be selected from the group consisting of ethers, methylated polyethers, methylated glycol ethers, fluorinated ethers, fluorinated alkyls, fluorinated cycloalkyls, carbonates, sulfolane and dimethylsulfoxide. Additionally or alternatively, the nonaqueous liquid electrolyte may comprise a room temperature ionic liquid solvent, for example in an amount of at least 50 wt. % of the total solvent in the electrolyte.

In some embodiments, the cationic proton carrier and the neutral proton acceptor are soluble in the electrolyte.

In some embodiments, the cationic proton carrier is charge balanced in the electrolyte by one or more electrochemically stable anions. The one or more electrochemically stable anions may be selected from the group consisting of tetrafluoroborate, hexafluorophosphate, chloride, perchlorate, fluoroalkyl phosphates such as tris(pentafluoroethyl) trifluorophosphate, fluoroaryl borates such as tetrakis[3,5-bis(trifluoromethyl)phenyl]borate and tetrakis(pentafluorophenyl)borate, fluoroalkyl borates such as tetrakis[hexafluoroisopropyl]borate, fluorinated bis(sulfonyl)imides such as bis(fluorosulfonyl)imide, bis(trifluoromethanesulfonyl) imide and (fluorosulfonyl)-(trifluoromethanesulfonyl)imide, and fluorinated sulfonates such as trifluoromethanesulfonate and other perfluoroalkylsulfonates.

In some embodiments, the cationic proton carrier and the neutral proton acceptor are present in the electrolyte in a combined concentration of greater than 0.001 mol/L, or greater than 0.01 mol/L, or in the range of between 0.1 mol/L and 4 mol/L.

In some embodiments, the hydrogen-containing species is selected from dihydrogen and water.

In some embodiments, the method comprises supplying the dinitrogen to the electrochemical cell at a partial pressure of greater than 1 bar, or greater than 5 bar, or preferably greater than 10 bar.

In some embodiments, the cathode has a potential of below (more negative than) −2.0 V vs $Ag/Ag^+$ when cathodically reducing the dinitrogen. The potential may be below the reduction potential of the metal, i.e. from its cation to its metallic form.

In accordance with a second aspect the invention provides a method of continuous electrochemical dinitrogen reduction to produce ammonia, the method comprising: supplying dinitrogen to an electrochemical cell comprising an electrolyte in contact with at least a cathode; introducing protons to the electrolyte by anodic oxidation of a hydrogen-containing species; and cathodically reducing the dinitrogen in the presence of lithium to produce ammonia, wherein the electrolyte comprises a cationic proton carrier capable of reversible deprotonation to form a neutral proton acceptor, wherein the cationic proton carrier is a phosphonium cation and the neutral proton acceptor is a phosphonium ylide.

In accordance with a third aspect the invention provides a method of continuous electrochemical dinitrogen reduction to produce ammonia, the method comprising: supplying dinitrogen to an electrochemical cell comprising an electrolyte in contact with at least a cathode; introducing protons to the electrolyte by anodic oxidation of a hydrogen-containing species; and cathodically reducing the dinitrogen in the presence of a metal selected from lithium, magnesium, calcium, strontium, barium, zinc, aluminium and vanadium to produce ammonia, wherein the electrolyte comprises at least one selected from an alkyl phosphonium cation and an alkyl sulfonium cation.

In some embodiments, the electrolyte comprises an alkyl phosphonium cation. The alkyl phosphonium cation may be a tetra-alkyl phosphonium cation, for example of the form $[PR^6R^7R^8R^9]+$ wherein $R^6$, $R^7$, $R^8$ and $R^9$ are independently selected from $C_1$-$C_{20}$ n-alkyl. In some embodiments, the alkyl phosphonium cation is capable of deprotonation to form an ylide when contacted with lithium nitride.

Relevant features relating to the first aspect of the invention are also applicable to the second and third aspects.

In accordance with a fourth aspect, the invention provides a liquid electrolyte for an electrochemical reduction reaction, comprising: (i) a neutral proton acceptor which is an ylide; (ii) a cationic proton carrier capable of reversible deprotonation to form the neutral proton acceptor; and (iii) a nonaqueous solvent.

In some embodiments, the liquid electrolyte further comprises: (iv) metal cations selected from lithium, magnesium, calcium, strontium, barium, zinc, aluminium and vanadium.

In some embodiments, the ylide comprises a carbanion adjacent to a cationic heteroatom selected from the group consisting of phosphorous, nitrogen, sulfur and oxygen.

In some embodiments, the neutral proton acceptor is selected from a phosphonium ylide and a sulfonium ylide. In some embodiments, the neutral proton acceptor is a phosphonium ylide.

In some embodiments, the cationic proton carrier is selected from an alkyl phosphonium cation and an alkyl sulfonium cation. In some embodiments, the cationic proton carrier is an alkyl phosphonium cation. The alkyl phosphonium cation may be a tetra-alkyl phosphonium cation, for example of the form $[PR^6R^7R^8R^9]^+$ wherein $R^6$, $R^7$, $R^8$ and $R^9$ are independently selected from $C_1$-$C_{20}$ n-alkyl.

In some embodiments, the cationic proton carrier is charge balanced in the liquid electrolyte by one or more electrochemically stable anions. The one or more electrochemically stable anions may be selected from the group consisting of tetrafluoroborate, hexafluorophosphate, chloride, perchlorate, fluoroalkyl phosphates such as tris(pentafluoroethyl) trifluorophosphate, fluoroaryl borates such as tetrakis[3,5-bis(trifluoromethyl)phenyl]borate and tetrakis (pentafluorophenyl)borate, fluoroalkyl borates such as tetrakis[hexafluoroisopropyl]borate, fluorinated bis(sulfonyl) imides such as bis(fluorosulfonyl)imide, bis (trifluoromethanesulfonyl)imide and (fluorosulfonyl)-(trifluoromethanesulfonyl)imide, and fluorinated sulfonates such as trifluoromethanesulfonate and other perfluoroalkylsulfonates.

In some embodiments, the liquid electrolyte is substantially free of water.

In some embodiments, the nonaqueous solvent comprises one or more molecular solvents. The molecular solvent(s) may be selected from the group consisting of ethers, methylated polyethers, methylated glycol ethers, fluorinated ethers, fluorinated alkyls, fluorinated cycloalkyls, carbonates, sulfolane and dim ethylsulfoxide.

In some embodiments, the nonaqueous solvent comprises a room temperature ionic liquid solvent, for example in an amount of at least 20 wt. %, or at least 50 wt. %, of the total nonaqueous solvent in the electrolyte.

In some embodiments, the cationic proton carrier is capable of deprotonation to form the neutral proton acceptor when contacted with lithium nitride.

In accordance with a fifth aspect, the invention provides a liquid electrolyte for an electrochemical reduction reaction, comprising: (i) a neutral proton acceptor which is a phosphonium ylide; (ii) a cationic proton carrier which is a phosphonium cation, wherein the cationic proton carrier is capable of reversible deprotonation to form the neutral proton acceptor; and (iii) a nonaqueous solvent.

Relevant features relating to the fourth aspect of the invention are also applicable to the fifth aspect.

In accordance with a sixth aspect, the invention provides use of a liquid electrolyte according to any embodiment of the third or fourth aspect for a reduction reaction in an electrochemical cell.

In some embodiments, the neutral proton acceptor is protonated by protons produced via anodic oxidation of a hydrogen-containing species in the electrochemical cell to form the cationic proton acceptor, and the cationic proton acceptor is deprotonated in the reduction reaction to re-form the neutral proton acceptor.

In some embodiments, the reduction reaction is a continuous electrochemical dinitrogen reduction mediated by a metal selected from lithium, magnesium, calcium, strontium, barium, zinc, aluminium and vanadium.

In accordance with a seventh aspect, the invention provides a system for continuous electrochemical reduction reactions, comprising an electrochemical cell comprising a cathode, an anode and a power supply to apply a voltage between the cathode and the anode; and a liquid electrolyte according to any embodiment of the third or fourth aspect in contact with at least the cathode.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
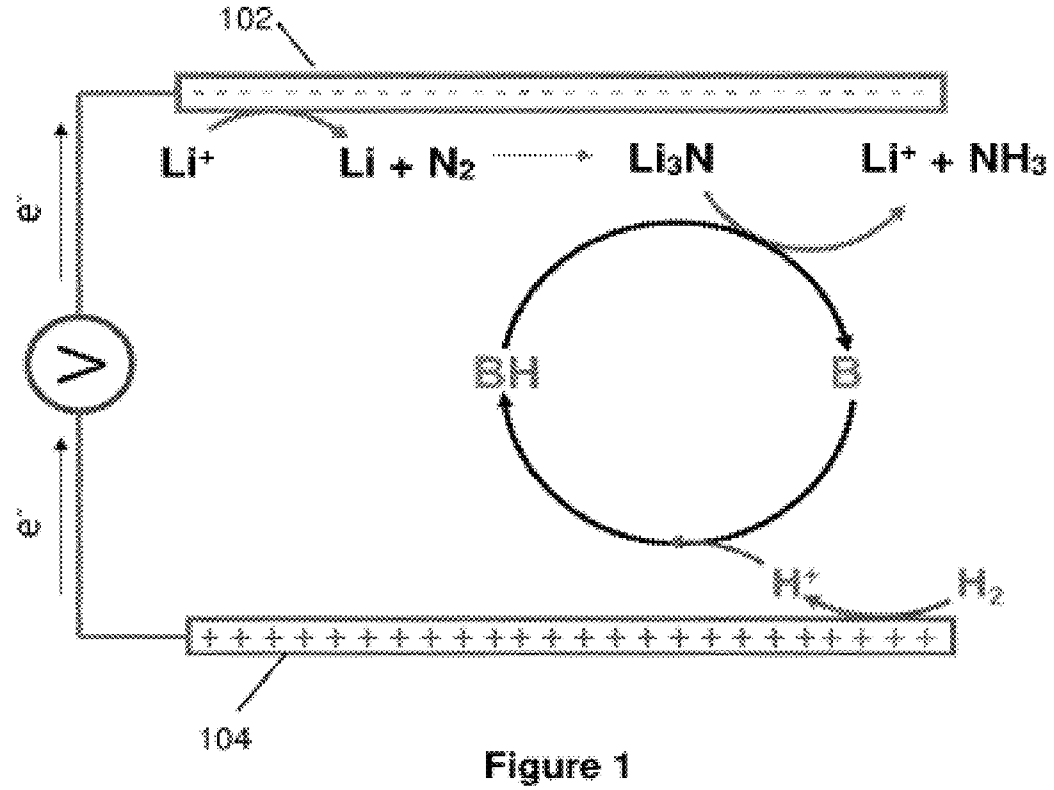
FIG. 1 schematically depicts the proposed mechanism of the continuous electrochemical dinitrogen reduction to produce ammonia.

Method of Continuous Electrochemical Dinitrogen Reduction to Produce Ammonia The present invention relates to a method of continuous electrochemical dinitrogen reduction to produce ammonia, generally performed in an electrochemical cell comprising a cathode, an anode and a power supply to apply a voltage between the cathode and anode. An electrolyte in the electrochemical cell, in contact with at least the cathode, comprises a cationic proton carrier. The cationic proton carrier is capable of reversible deprotonation to form a neutral proton acceptor, which is an ylide molecule. The method includes the elements of supplying dinitrogen to the electrochemical cell for reaction, introducing protons to the electrolyte by anodic oxidation of a hydrogen-containing species and cathodically reducing the dinitrogen in the presence of a metal selected from lithium, magnesium, calcium, strontium, barium, zinc, aluminium and vanadium to produce ammonia. The metal may be present in the electrolyte and/or on the cathode surface. The cationic proton carrier provides the protons for producing the ammonia, and may thus be deprotonated to form the neutral proton acceptor.

Without wishing to be bound by any theory, it is proposed that the ammonia synthesis reaction of the invention proceeds via the commonly understood mechanism for continuous lithium-mediated ammonia. According to this proposal, metal cations are reduced on the cathode to form a corresponding metallic metal, dinitrogen reacts with the metallic metal to form a corresponding metal nitride, and the metal nitride is then protonated by the cationic proton carrier to produce ammonia, form the neutral proton acceptor and regenerate the metal cations. The cationic proton carrier is continuously regenerated in the electrolyte by protonating the neutral proton acceptor with protons introduced to the electrolyte by oxidation of a hydrogen-containing species at the anode.

A key difference from conventional lithium-mediated ammonia synthesis is the use of a cationic proton carrier and its corresponding neutral proton acceptor, in particular a cationic proton carrier which deprotonates to form an ylide proton acceptor. This has been found to provide a number of advantages over neutral proton carriers, such as alcohols, which deprotonate to anionic proton acceptors.

These advantages may include a lower initial cell resistance and increased cell stability. Moreover, excellent faradaic efficiencies and high reaction rates may be obtained. It is proposed that the improved performance is due, at least in part, to the absence of any anionic species in the reaction sequence. Indeed, the only anions necessarily present in the system during $NH_3$ synthesis are those intentionally introduced, in particular as counterions to the metal cations and/or the cationic proton donor. These anions may be selected for their cathodic and anodic stability under electrochemical reaction conditions, and their solubility in the electrolyte, thus avoiding or minimising anionic degradation pathways.

The improved performance may also be due to the tendency of cationic species to be attracted by electrostatic forces towards the negative electrode. The cationic proton donor may thus become enriched in the electrolyte layer closest to the cathode, thereby enhancing its availability to the protonation reaction at or near the cathode surface.

A continuous electrochemical dinitrogen reduction can be distinguished from a sequential electrochemical process where dinitrogen is converted to ammonia in a series of temporally and/or spatially separated process steps, e.g. separate batch processes for lithium electrolysis, lithium nitride formation and ammonia production. As explained above, it is proposed that the continuous reduction involves cycling of one or more species, including a metal species and/or the proton carrier species, between different forms in a single process step of the synthesis.

Metal

The continuous electrochemical dinitrogen reduction is mediated, or catalysed, by a metal. It is proposed that the synthesis involves a metal nitride intermediate in the reaction cycle. Accordingly, a range of metals capable of forming metal nitrides from dinitrogen under the electrochemical reaction conditions may be used in the invention. As used herein, a "metal" refers to a metal element, and does not imply a specific reduction state or species. Where a metal in its zero oxidation state metallic form is specifically identified, for example in the context of a proposed reaction mechanism, this will be termed its "metallic form" or a "metallic metal".

According to the previously proposed mechanism, electrochemical reduction of metal cations produces metallic metal on the cathode, which spontaneously reacts with $N_2$ to produce the corresponding metal nitride. This latter reaction should thus be thermodynamically favourable (negative Gibbs energy of the generic reaction $nM^++mN_2 \leftrightarrows M_nN_{2m}$) under the conditions of the ammonia electrosynthesis. Based on tabulated thermodynamic data (e.g. L. B. Pankratz, et al, Thermodynamic Data for Mineral Technology, Washington D.C., 1984 John R. Rumble, CRC Handbook of Chemistry and Physics 101st Edition, 2020), published theoretical calculations (e.g. Nørskov et al, in *Energy Environ. Sci.,* 2017, 10, 1621-1630) and experimental reports (e.g. DE102018210304), suitable metals include lithium, magnesium, calcium, strontium, barium, zinc, aluminium, and vanadium.

In some embodiments, the metal comprises, or consists of, lithium. Lithium is considered particularly suitable due to its demonstrated ability to activate dinitrogen at ambient temperatures.

The metal may be present during the reduction in the form of metal cations dissolved in the electrolyte, e.g. $Li^+$. As noted above, it is believed that the reaction cycle involves a reduction of metal cations, from the electrolyte, to form metallic metal on the cathode, with the metal cations being regenerated as the final step of the cycle. However, it is also considered possible that the metal cycles during continuous reaction between solid species on the cathode surface (for example metal nitride and metallic metal) without soluble metal cations as an intermediate. Thus, for the case of lithium, the cathodic reaction mechanism might in principle involve (i) chemical reaction of metallic lithium on the cathode with dinitrogen to form lithium nitride, and (ii) direct electrochemical reduction of the lithium nitride in the presence of the cationic proton donor to directly regenerate metallic lithium and produce ammonia (i.e. $Li_3N+3HB+3e^-=NH_3+3Li(0)+3B^-$).

The metal cations may be present in the electrolyte in a concentration of greater than 0.001 mol/L, or greater than 0.01 mol/L, or greater than 0.1 mol/L. The upper range of the concentration is considered to be limited only by the solubility of the precursor metal salt in the electrolyte medium. In some embodiments, the concentration of metal cations in the electrolyte is in the range of between 0.1 mol/L and 4 mol/L, such as about 0.2 mol/L.

The metal is most conveniently introduced to the electrochemical cell in cationic form, for example by dissolving a suitable metal salt in the electrolyte. However, it is not excluded that the metal is introduced as metal nitride or even in the metallic form. Assuming metal cations are involved in the reaction cycle, these may be generated in situ in the electrolyte from such species.

Cationic Proton Carrier—Ylide Proton Acceptor

The electrolyte further comprises a cationic proton carrier capable of reversible deprotonation to form a neutral proton acceptor. The proton carrier and the proton acceptor are typically organic species. As used herein, reversible deprotonation means that the cationic proton carrier can be deprotonated to form the neutral proton acceptor, which in turn can be re-protonated to regenerate the cationic proton carrier.

Consistent with the proposed mechanism, the cationic proton carrier may be capable of deprotonation to the neutral proton acceptor by reacting with a metal nitride such as $Li_3N$, preferably in solution at room temperature. The neutral proton acceptor may be capable of protonation to form the cationic proton carrier by reaction with free protons and/or an organic acid, preferably in solution at room temperature. The inventors have found that such reactions may be a convenient way to evaluate cationic proton carrier-neutral proton acceptor candidates for possible use in the methods of the invention.

The neutral proton acceptor molecule is an ylide, which is a neutral dipolar molecule containing an atom having a formal negative charge directly attached to a heteroatom having a formal positive charge. An ylide is thus a type of zwitterion.

Without wishing to be bound by any theory, it is believed that suitable ylides are capable of reversible interconversion with a cationic proton donor by protonation and deprotonation reactions, as required, because the electrons of the negative charge are partly shared with the empty orbitals of the positive centre. It is believed that this provides the protonated form with acidity in the weakly acidic range required of a proton donor in continuous metal-mediated ammonia synthesis.

In some embodiments, the ylide comprises a carbanion adjacent to a positively charged heteroatom. The proton carrier site on the molecule is thus a carbon atom, which transitions between a carbanion in the deprotonated form to a C—H covalent bond in the protonated form. The positively charged (or cationic) heteroatom of the ylide may be selected from the group consisting of phosphorous, nitrogen, sulfur and oxygen.

In some embodiments, the cationic proton donor is a phosphonium cation or a sulfonium cation and the neutral proton acceptor is a corresponding phosphonium ylide or sulfonium ylide. In some embodiments, the cationic proton donor is a phosphonium cation and the neutral proton acceptor is a corresponding phosphonium ylide.

In some embodiments, the cationic proton carrier is an alkyl phosphonium cation or an alkyl sulfonium cation, and the neutral proton acceptor is the corresponding phosphonium ylide or sulfonium ylide. As used herein, an alkyl phosphonium or alkyl sulfonium cation refers to a phosphonium or sulfonium cation comprising at least one optionally substituted alkyl group. In some embodiments, the cationic proton donor is an alkyl phosphonium cation and the neutral proton acceptor is a corresponding phosphonium ylide. The alkyl phosphonium cation may generally be any such species capable of deprotonating to form a phosphonium-carbanion ylide $(R')_3P^+—C^-(R'')_2$ where each R' and R'' organyl group may be the same or different.

The deprotonation of alkyl phosphonium cations to form ylides is known in the field of synthetic organic chemistry, where the ylide is commonly referred to as a Wittig reagent. Phosphonium-carbanion ylides are useful as nucleophilic reagents in a number of synthetic reaction schemes. In the Wittig reaction, for example, the phosphonium ylide reacts with a carbonyl group via [2+2] cycloaddition to form an oxaphosphetane, followed by elimination and generation of alkene and phosphine oxide. Synthetic reactions with ylide reagents are generally driven by the non-reversible conversion of the reactive ylide to a stable species such as phosphine oxide.

By contrast, embodiments of the present invention use the phosphonium ylide as a reversible proton-shuttling agent, intercepting protons in the electrolyte and transporting them for a protonation reaction with nitrogen to form ammonia.

A wide range of alkyl phosphonium cations are considered suitable in the invention subject only to the requirement that they are susceptible to reversible deprotonation to an ylide proton acceptor, for example as depicted in Scheme 1. The alkyl phosphonium cation may thus have a structure of Formula I and the corresponding ylide has the structure of Formula II:

Scheme I

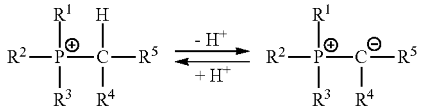

Formula I Formula II

In some embodiments, $R^1$, $R^2$, $R^3$ are independently selected from alkyl (e.g. $C_1$-$C_{20}$ n-alkyl groups) and aryl (e.g. phenyl groups), $R^4$ is selected from hydrogen, alkyl (e.g. $C_1$-$C_{20}$ n-alkyl groups) and aryl (e.g. phenyl groups) and $R^5$ is selected from hydrogen, alkyl (e.g. $C_1$-$C_{19}$ alkyl groups), cycloalkyl (e.g. $C_3$-$C_6$ cycloalkyl groups), alkyl (e.g. $C_1$-$C_{19}$ alkyl) or cycloalkyl substituted by halogen, ether, ester, acyl, amino and nitrile functional groups, aryl (e.g. phenyl groups including —$C_6F_5$), ester (e.g. —C(═O)O($C_1$-$C_6$alkyl), amide (e.g. C(═O)NH$C_6F_5$, C(═O)N(Me)OMe), nitrile (—CN), halogen, ether (e.g. —O($C_1$-$C_6$alkyl), thioether (e.g. —S($C_1$-$C_6$alkyl), —S$C_6F_5$), —P$R^{10}R^{11}$ and —P(═O)$R^{12}R^{13}$, wherein $R^{10}$-$R^{13}$ are independently alkyl (e.g. $C_1$-$C_6$)alkyl and aryl (e.g. —$C_6F_5$). The alkyl and aryl groups in any of $R^1$-$R^4$ may be unsubstituted or substituted with substituents such as halogen, ether, hydroxy, ester, acyl, amino and nitrile functional groups, and the like, and any two of $R^1$-$R^4$ may be connected to form a cyclic structure.

As the skilled person will appreciate, the groups $R^1$-$R^5$, and particularly $R^5$, may be selected to control the acidity, and thus the proton donating ability, of the alkyl phosphonium cation.

In some embodiments, $R^1$, $R^2$ and $R^3$ are independently selected from $C_1$-$C_{20}$ n-alkyl and phenyl, $R^4$ is hydrogen and $R^5$ is selected from hydrogen and $C_1$-$C_{19}$ n-alkyl.

In some embodiments, the alkyl phosphonium cation is an ionic liquid cation, meaning that it is capable of forming an ionic liquid, for example a room temperature ionic liquid, when paired with a suitable counterion. As used herein, an ionic liquid is a salt with a melting temperature of below 100° C., while a room temperature ionic liquid has a melting temperature below c.a. 25° C. Such cations may be preferred due to their high solubility/miscibility with other solvents and salts in the electrolyte, and their high conductivity. A range of phosphonium cations of general Formula I, including tetra-alkyl phosphonium cations, form ionic liquids in combination with counterions such as $BF_4^-$, $PF_6^-$, fluoroalkyl phosphates including tris(pentafluoroethyl) trifluorophosphate (eFAP), fluoroalkyl borates such as tetrakis [hexafluoroisopropyl]borate, fluorinated bis(sulfonyl)imides including bis(fluorosulfonyl)imide, bis(trifluoromethanesulfonyl)imide (TFSI) and (fluorosulfonyl)-(trifluoromethanesulfonyl)imide and fluorinated sulfonates including triflate and other perfluoroalkylsulfonates. Ionic liquids of this type have been used, without dissolved metal cations, in the context of nitrogen reduction in the prior art (e.g. MacFarlane et al, WO 2017/132721 A1), however at the cathode potentials disclosed in the prior art, these ionic liquid do not show any tendency to deprotonate. At the more significantly negative potentials required in the present case, for example more negative than −2.0 V vs Ag/Ag+, to achieve metal nitride formation these ionic liquids can become active proton donors.

In some embodiments, the alkyl phosphonium cation is a tetra-alkyl phosphonium cation. The tetra-alkyl phosphonium cation may have the structure $[PR^6R^7R^8R^9]^+$, wherein $R^6$, $R^7$, $R^8$ and $R^9$ are independently selected from $C_1$-$C_{20}$ n-alkyl. In some embodiments, the combined sum of the carbon atoms in $R^6$, $R^7$, $R^8$ and $R^9$ is at least 7, or at least 13, or at least 16. As the skilled person will appreciate, an increase in the combined chain length of the tetra-alkyl phosphonium cation will generally increase its solubility in organic media, reduce the melting point of its salts and decrease its tendency to absorb or dissolve water. In some embodiments, $R^6$, $R^7$ and $R^8$ are independently selected from $C_4$-$C_{29}$ n-alkyl and $R^9$ is a $C_1$-$C_{29}$ n-alkyl.

During the continuous $NH_3$ synthesis, and particularly at or near steady state operating conditions, the electrolyte will generally include a mixture of both the cationic proton carrier and the ylide proton acceptor. A continuously operated cell will reach steady state relative concentrations of both species when the production of protons at the anode is exactly matched by their consumption at the cathode (either as the desired $NH_3$ or by-products such as $H_2$), provided that other materials (e.g. Li, $Li_3N$, LiH) are not accumulating. Indeed, the presence of both species in the electrolyte is understood to create a desirable buffering action. The buffering allows the proton carrier to absorb excess proton production at the anode during start up and/or intermittency-driven variations in current. Moreover, operating with a significant concentration of the ylide proton acceptor in the electrolyte ensures that a high proportion of the protons are intercepted and consumed by the ylide before they can participate in undesirable cathodic reactions such as the HER.

In some embodiments, the proton carrier system is introduced to the chemical cell in its cationic form, for example by dissolving a suitable salt of the cationic proton carrier species in the electrolyte. However, it will be appreciated that either the cationic proton donor or the corresponding ylide proton acceptor may be supplied to the electrochemical cell to facilitate the $NH_3$ synthesis reaction; a mixture of the two species may be formed in situ in both cases as explained above.

The cationic proton donor and its corresponding ylide proton acceptor may be present in the electrolyte in a combined concentration of greater than 0.001 mol/L, or greater than 0.01 mol/L, or greater than 0.05 mol/L. In some embodiments, for example when the electrolyte solvent is primarily a molecular organic solvent, the combined concentration is in the range of between 0.05 mol/L and 1 mol/L, such as about 0.1 mol/L. In other embodiments, for example where a phosphonium-based ionic liquid forms a significant proportion of the electrolyte solvent, the combined concentration of the cationic proton donor and its corresponding ylide proton acceptor may be substantially higher.

It will be appreciated, in view of the proposed reaction mechanism, that the total concentration of metal cations and the cationic proton carrier are expected to remain constant during the electrochemical $NH_3$ synthesis, though the ratio of these two species may vary at different steady state conditions. In some embodiments, the metal cations and the cationic proton carrier are present in the electrolyte in a combined concentration of greater than 0.001 mol/L, or greater than 0.01 mol/L, or greater than 0.1 mol/L. The combined concentration may be in the range of between 0.1 mol/L and 4 mol/L, or between 0.1 mol/L and 1 mol/L, such as about 0.3 mol/L.

Electrochemically Stable Anions

The electrolyte contains one or more anions to charge balance the cationic species present in the electrolyte, including the metal cations and the cationic proton carrier. The anions are preferably electrochemically stable anions. As used herein, an electrochemically stable anion is an anion which is acceptably stable against, or not significantly susceptible to, cathodic or anodic reactions under the conditions of the continuous electrochemical dinitrogen reduction.

As already mentioned, it is believed that significant advantage is obtained in the methods of the invention because anionic species are not involved in the reaction pathway. The anions present in the electrolyte, including those required to charge balance the metal cations and cationic proton carrier, may thus be selected for their cathodic and anodic stability under the electrochemical reaction conditions, and their solubility in the electrolyte, thus avoiding or minimising anionic degradation pathways.

A wide range of electrochemically stable anions are known in the fields of electrochemistry synthesis and ionic liquid technology, and any such anions or combinations thereof are considered suitable in the methods of the invention. Non-limiting examples of suitable anions include tetrafluoroborate, hexafluorophosphate, perchlorate, fluoroalkyl phosphates such as tris(pentafluoroethyl) trifluorophosphate, fluoroaryl borates such as tetrakis[3,5-bis(trifluoromethyl)phenyl]borate and tetrakis(pentafluorophenyl)borate, fluoroalkyl borates such as tetrakis[hexafluoroisopropyl]borate, fluorinated bis(sulfonyl)imides such as bis(fluorosulfonyl)imide, bis(trifluoromethanesulfonyl) imide and (fluorosulfonyl)-(trifluoromethanesulfonyl)imide, and fluorinated sulfonates such as trifluoromethanesulfonate (triflate) and other perfluoroalkylsulfonates (e.g. perfluorohexanesulfonate). Chloride is considered sufficiently stable against anodic oxidation in some embodiments, for example when the anode reaction is $H_2$, and may thus also be used.

The electrochemically stable anions may be introduced to the electrolyte with the metal cations, i.e. as a metal salt, or with the cationic proton donor, or with both.

Solvent

The electrolyte is typically a nonaqueous liquid electrolyte, and may thus include one or more nonaqueous solvents. Suitable nonaqueous solvents are generally aprotic solvents, and may include both aprotic molecular solvents and ionic solvents such as room temperature ionic liquids. The solvent should preferably be stable under the reaction conditions, or at most degrade to a small extent.

The nonaqueous solvent should ideally be a good solvent for key species involved in the reaction cycle, including the metal cations, the cationic proton carrier and the ylide proton acceptor. It is noted that the solubility of the cationic species in a particular solvent may be increased by a judicious choice of counterion, and by design of the cationic proton carrier system as disclosed herein. A wide range of aprotic solvents may thus be suitable in embodiments of the invention.

In some embodiments, the nonaqueous liquid electrolyte comprises one or more molecular solvents selected from the group consisting of ethers, methylated polyethers, methylated glycol ethers such as tetraglyme, fluorinated ethers, fluorinated alkyls, fluorinated cycloalkyls, carbonates, sulfolane and dimethylsulfoxide.

In some embodiments, the nonaqueous liquid electrolyte comprises a room temperature ionic liquid solvent, for example in an amount of at least 20 wt. %, or at least 50 wt. % of the total nonaqueous solvent in the electrolyte. A wide range of room temperature ionic liquids are known as suitable solvents for electrochemical syntheses, for example as disclosed in WO2017/132721, and such solvents may generally be used in the presently disclosed methods.

Thus, in some embodiments, the room temperature ionic liquid solvent comprises:

(i) at least one cation selected from the group consisting of PRS-4 (phosphonium), $NR_{1-4}$ (tetra alkylammonium), $C_4H_8NR_2$ (pyrrolidinium), wherein each R group is independently linear, branched or cyclic and preferably comprises from 1 to 18 carbon atoms, is optionally partially or completely halogenated, optionally includes a heteroatom, optionally includes a functional group chosen from ethers, alcohols, carbonyls (acetates), thiols, sulphoxides, sulphonates, amines, azos or nitriles, and wherein two R groups may connect to form a monocyclic or heterocyclic ring; and (ii) at least one anion selected from the group consisting of $(R'O)_xPF_{6-x}$ (phosphate), $(R'O)_xBF_{4-x}$ (borate), $R'SO_2NSO_2R'$ (imide), $R'SO_2C(SO_2R')(SO_2R')$ (methide), $FSO_2NSO_2F$, $C_2O_4BF_2$, $C_2O_4PF_4$, $RC_2O_4BF_2$, $RC_2O_4PF_4$, $CF_3SO_3$ (triflate), $R'SO_3$ (sulphonate), $R'CO_2$, (carboxylate), $CF_3COO$ (trifluoroacetate), $R'_xPF_{6-x}$ (FAP), $R'_xBF_{4-x}$ wherein each R' group is independently linear, branched or cyclic and preferably comprises from 1 to 18 carbon atoms, optionally partially or completely fluorinated and optionally including a functional group chosen from ethers, alcohols, carbonyls (acetates), thiols, sulphoxides, sulphonates, amines, azos or nitriles and wherein two R' groups may connect to form a monocyclic or heterocyclic ring. In each case x ranges from zero up to the maximum number of covalent bonds possible for the central atom.

In some embodiments, the ionic liquid solvent is stable, i.e. substantially non-reactive, under the conditions of the electrochemical $NH_3$ synthesis.

In other embodiments, at least one cation of the ionic liquid solvent is a cationic proton carrier species which is capable of reversible deprotonation to form an ylide proton acceptor. Examples of such an ionic liquid are those with tetra-alkyl phosphonium cations, as disclosed herein. It is envisaged that phosphonium-based ionic liquid solvents may, in the absence of water, facilitate the metal-mediated continuous electrochemical dinitrogen reduction to ammonia according to the principles disclosed herein. The electrolyte solvent may consist of ionic liquid solvent having the reactive cations. Alternatively, ionic liquid solvent having a mixture of reactive and stable cations may be used, or mixture of reactive ionic liquids and stable molecular solvents may be used.

The electrolyte is preferably substantially free of water, meaning that the amount of water is zero or low enough that it does not interfere to a significant extent with the reaction cycle of the continuous, metal-mediated electrochemical $NH_3$ synthesis reaction as disclosed herein. For example, it may contain no more than 1000 ppm of water, preferably less than 100 ppm and most preferably less than 20 ppm.

The electrolyte may have a viscosity which is sufficiently low that mass transfer limitations are avoided or acceptably low. In some embodiments, the non-aqueous electrolyte has a viscosity of less than 50 MPa s, or below 20 MPa s, or below 15 MPa s at 25° C. This viscosity may be measured according to ISO 12058 with a Lovis 2000M Anton Paar viscosimeter (Lovis angle of 30°).

Supplying Dinitrogen for Reduction to Ammonia

The methods of the invention include supplying dinitrogen to an electrochemical cell comprising an electrolyte in contact with at least the cathode, and cathodically reducing the dinitrogen in the presence of the metal to produce ammonia.

It will be appreciated that "cathodically reducing", as used herein, does not indicate any particular mechanism, specify intermediate species involved in the reaction cycle or imply where these species react (e.g. on the cathode surface or in the bulk electrolyte). However, without wishing to be bound by any theory, it is proposed that the dinitrogen is cathodically reduced to ammonia according to the mechanism disclosed herein with reference to FIG. 1. In the present invention, the proton donor (BH in FIG. 1) is a cationic proton carrier ($Y—H^+$) and the proton acceptor (B in FIG. 1) is the corresponding neutral ylide molecule (Y), as generally disclosed herein. The overall cathodic nitrogen reduction reaction is thus considered to be a shown in equation (3):

$$N_2+6Y—H^++6e^-\rightarrow 2NH_3+6Y \quad (3)$$

The cathode may thus be at a potential suitable to drive this cathodic reaction. The potential may, in particular, be below (more negative than) the reduction potential of the metal cations to the corresponding reduced form, e.g. the metallic form and/or metal nitride (e.g. the $Li^+/Li$ reduction potential). This reduction potential may be determined as the apparent reduction potential of the metal cation in the non-aqueous electrolyte under dinitrogen reduction conditions, as measured by the crossover point in cyclic voltammetry.

In some embodiments, the cathode potential is below (more negative than) −0.2 V, or −0.4 V, relative to the apparent reduction potential of the metal cation in the non-aqueous electrolyte. At such potentials, excellent yield rates and faradaic efficiencies may be obtained. In some embodiments, however, the cathode potential is above (more positive than) −1 V, or −0.8 V, relative to the apparent reduction potential of the metal cation in the non-aqueous electrolyte.

The dinitrogen may be supplied to the electrochemical cell at a partial pressure partial pressure of greater than 1 bar, or greater than 5 bar, or greater than 10 bar. In some embodiments, the dinitrogen is supplied at a partial pressure in the range of 0.7 bar to 100 bar, or 2 bar to 30 bar, or 5 bar to 20 bar. Elevated partial pressures of $N_2$ in the cell may improve the faradaic efficiency of the ammonia synthesis by increasing the concentration of $N_2$ dissolved in the electrolyte. This is believed to favour the desired reaction between $N_2$ and the metallic metal to form metal nitride.

The dinitrogen may be supplied to the electrochemical cell for cathodic reduction by contacting the electrolyte with dinitrogen, thereby solubilising the dinitrogen in the electrolyte. In some embodiments, the dinitrogen is predominantly, or exclusively, present in the solution phase when exposed to the cathode. Alternatively the dinitrogen gas may be passed over the cathode, creating a three phase boundary between the electrode the gas and the electrolyte.

The electrolyte may be maintained at a suitable temperature to facilitate the ammonia synthesis. The temperature may be in the range of −35° C. to 200° C., such as 15° C. to 100° C.

The product ammonia is expected to speciate in the electrolyte as $NH_3$ rather than $NH_4^+$, since the ammonium cation is a stronger acid than the cationic proton carrier of the invention (such as alkyl phosphonium). However, if excess protons are produced, it is not excluded that some ammonia in the form of $NH_4^+$ may be produced.

Anodic Oxidation

The methods of the invention include introducing protons to the electrolyte by anodic oxidation of a hydrogen-containing species. According to the principles disclosed herein, the protons are expected to react with the ylide proton acceptor in the electrolyte to regenerate the cationic proton carrier. It is the latter species, rather than the protons themselves, which is believed to be the primary protonating agent involved in the nitrogen reduction reaction.

The protons may be produced at the anode of the electrochemical cell by oxidation of any suitable hydrogen-containing species, including dihydrogen ($H_2$) and water ($H_2O$). The anodic half-reactions of these reactants are shown in equations (4) and (5) respectively.

$$H_2 \rightarrow 2H^+ + 2e^- \quad (4)$$

$$2H_2O \rightarrow O_2 \pm 4H^+ + 4e^- \quad (5)$$

The overall anodic regeneration process for the proton carrier, to balance equation (3), may thus be as shown in either equation (6) or (7), where Y is the ylide proton acceptor and Y—$H^+$ is the cationic proton carrier:

$$3H_2 + 6Y \rightarrow 6Y\text{—}H^+ + 6e^- \quad (6)$$

$$3H_2O + 6Y \rightarrow 3/2O_2 \pm 6Y\text{—}H^+ + 6e^- \quad (7)$$

For the case where $H_2$ is oxidised to produce the protons, the electrolyte comprising the cationic proton carrier may be contacted with both the cathode and the anode. The protons are thus directly introduced to the electrolyte when formed at the anode. The $H_2$ may be obtained from any source, including from the electrolysis of water with renewable power. Optionally, a water electrolysis cell can be integrated with the nitrogen reduction cell to supply the $H_2$ directly from electrolysis to nitrogen reduction.

Due to its low cost, water is a particularly desirable source of protons in electrochemical syntheses, but is known to interfere with the metal-mediated continuous electrochemical dinitrogen reduction. Therefore, for the case where $H_2O$ is oxidised to produce the protons, an indirect transfer of protons from the anode to the electrolyte comprising the cationic proton carrier may be preferred. This may help to acceptably limit or avoid the presence of water in the electrolyte where nitrogen reduction takes place. For example, the electrochemical cell may comprise two electrolytes: a catholyte comprising the cationic proton carrier (as generally disclosed herein) and an anolyte (either liquid, solid or solid-liquid mixture) in contact with the anode where water is oxidised. The electrochemical cell is configured to allow proton transfer from the anolyte to the catholyte, but to substantially limit or avoid water transfer. Various arrangements to achieve this are known in the field of electrochemical synthesis, as will be explained in greater detail hereafter.

$H_2$ is typically a significant by-product of the nitrogen reduction reaction due to competition from the HER at the cathode. The $H_2$ by-product may optionally be recycled for oxidation at the cathode, supplementing the feed of the chosen hydrogen-containing species. This results in reduced energy consumption per unit of ammonia produced as there is no other energy containing by-product.

Electrochemical Cell

The methods of the invention are generally performed in an electrochemical cell comprising a cathode, an anode and a power supply connected to the cathode and the anode. The power supply is configured to apply a voltage between the cathode and the anode sufficient to drive the electrochemical ammonia synthesis.

The cathode may generally be any conductive electrode which is stable at the required reduction potential, for example metallic electrodes as used in previously reported lithium-mediated continuous electrochemical syntheses (e.g. Tsuneto et al, Chemistry Letters 1993, 851-854) or other processes involving reduction of the metal cations to the metallic form. Non-limiting examples of suitable metals may include Ni, Nb, Ti, Mo, Fe, Cu, Ag and Zn and alloys thereof. In some embodiments, a copper (Cu) cathode is used. In other embodiments, the metal of the cathode comprises or consists of the metal which mediates the ammonia synthesis, in metallic form.

The cathode can be a cylinder, disc, plate or other shape appropriate for the cell design. The cathode may additionally be porous, for example as achieved by etching or be constructed as a foam or as a mass of compressed particles or via an inverse opal structure. The desired mediator metal may also be coated by for example electrodeposition or chemical deposition onto an underlying structure that provides optimum roughness and porosity. The cathode may also be formed by depositing metal nanoparticles into an otherwise inert structure.

Suitable anodes for oxidation of hydrogen-containing species, such as $H_2O$ or $H_2$, to form protons are well known in the field of electrochemistry. In some embodiments, the anode is a platinum electrode.

The power supply may be any conventional power supply for electrolysis systems, such as a direct current power source. Optionally, the power supply may include a photovoltaic solar cell. It is considered a particular advantage of the present invention that ammonia may be produced from electrical power, and particularly renewable power. For example, it is envisaged that the invention may allow ammonia-based fertilizers to be produced at the point of need using solar or wind-generated power; this may be particularly valuable for high value agricultural applications such as hydroponics, or to minimise logistical challenges associated with fertilizer transport to remote areas.

Figure 2:
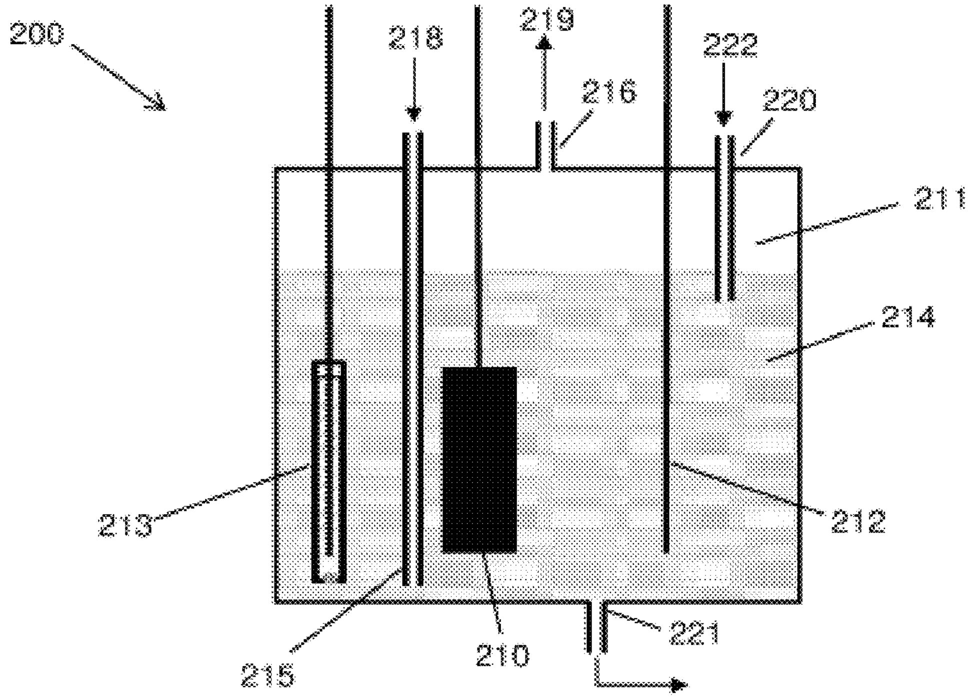
FIG. 2 schematically depicts a single compartment electrochemical cell for performing a continuous electrochemical dinitrogen reduction according to embodiments of the invention, using $H_2$ as the hydrogen-containing species.

An example of an electrochemical cell for performing embodiments of the invention is schematically depicted in FIG. 2. Cell 200 includes copper cathode 210 in cell chamber 211. Cell 200 further comprises platinum anode 212, and optionally reference electrode 213 of conventional type, such as $Ag/Ag^+$. The three electrodes are immersed in the same nonaqueous liquid electrolyte 214, which comprises lithium cations and a cationic proton carrier as generally disclosed herein. Optionally, a stirrer or other means for mixing or circulating the electrolyte may be included to provide intensified mass transport in cell chamber 211. The electrodes are connected to a power source (not shown) capable of applying a voltage between cathode 210 and anode 212, with the reduction potential of the cathode controlled (or measured) relative to the reference electrode.

Cell 200 further comprises gas inlet 215 to introduce gas mixture 218, comprising dinitrogen ($N_2$) and dihydrogen ($H_2$), to chamber 211. The cell may include gas outlet 216 for removing gas 219 from the headspace of the chamber, electrolyte inlet 220 for replenishing the electrolyte with electrolyte feed 222, and electrolyte outlet 221 for withdrawing electrolyte 214. The cell is preferably configured for operation at elevated pressures.

In use, gas mixture 218 is pressurised into chamber 211 via feed inlet 215, and a voltage is applied between the cathode and the anode sufficient to establish a reduction potential at cathode 210 which is below (more negative than) the $Li^+/Li$ reduction potential. The partial pressure of dinitrogen in cell chamber 211 may be greater than 10 bar, and that of dihydrogen greater than 1 bar. The resulting flow of current through the cell results in the electrochemical reduction of dinitrogen to ammonia according to the principles disclosed herein. The ammonia product may be removed continuously or periodically from cell chamber 211 in gas 219 via gas outlet 216 and/or in electrolyte 214 withdrawn via electrolyte outlet 221.

In some embodiments, the cell is operated at steady state by continuously withdrawing one or both of these flows, and continuously replenishing the gas reactants ($N_2$ and $H_2$) and/or electrolyte by introducing gas mixture 218 and/or electrolyte feed 222 as required. The ammonia may be separated from the withdrawn streams of gas 219 and/or electrolyte 214, and the residual gas and electrolyte may be recycled to cell chamber 211 as part of gas mixture 218 and electrolyte feed 222 respectively. A portion of the electrolyte 214 withdrawn via electrolyte outlet 221 may be discarded (or regenerated) and replaced with fresh electrolyte in feed 222, thus maintaining a target electrolyte residence time in the cell.

In one embodiment of a point of use fertiliser generating cell, the exiting gas stream 219 is passed through a solution of sulphuric or phosphoric acid in water to absorb the ammonia as ammonium ($NH_4^+$). The product of this process is a solution of the ammonium salt of the acid used, for example ammonium sulphate solution, and can be applied directly as a fertilising solution. In the case of hydroponic or commercial greenhouse use, the cell can be controlled to continuously provide a supply of fertiliser in-line in the water supply to the plants.

Figure 3:
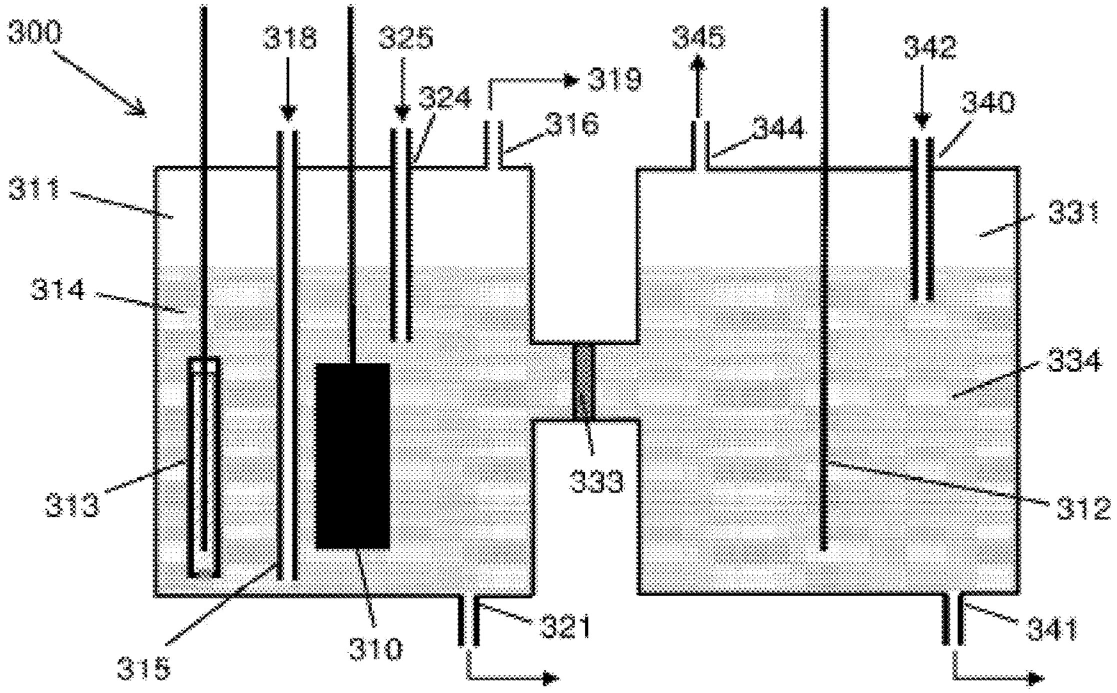
FIG. 3 schematically depicts a membrane-separated dual compartment electrochemical cell for performing a continuous electrochemical dinitrogen reduction according to embodiments of the invention, using $H_2O$ as the hydrogen-containing species.

Another example of an electrochemical cell for performing embodiments of the invention is schematically depicted in FIG. 3. Cell 300 includes cathodic chamber 311 and anodic chamber 331, which are separated by proton-permeable membrane separator 333, for example a membrane made of a sulfonated poly(tetrafluorethylene) ionomer such as Nafion. Copper cathode 310 is disposed in cathodic chamber 311. Reference electrode 313 of conventional type is also in the cathodic chamber. Platinum anode 312 is disposed in anodic chamber 331. The electrodes are connected to a power source (not shown) capable of applying a voltage between cathode 310 and anode 312, with the reduction potential of the cathode controlled (or measured) relative to the reference electrode.

Cathode 310 and reference electrode 313 are immersed in catholyte 314, while anode 312 is immersed in anolyte 334. Catholyte 314 is a nonaqueous liquid electrolyte which comprises lithium cations and a cationic proton carrier as generally disclosed herein, and is substantially free of water. Anolyte 334 includes water for oxidation at the anode, but otherwise may be the same or different in composition compared to catholyte 314. Membrane separator 333 inhibits or substantially prevents the transmission of species other than protons between the cathodic and anodic reaction chambers.

Cell 300 further comprises gas feed inlet 315 to introduce dinitrogen feed 318 to cathodic chamber 311. The cell may include cathodic gas outlet 316 for removing gas 319 from the headspace of the cathodic chamber, catholyte inlet 324 for replenishing the catholyte with catholyte feed 325, and catholyte outlet 321 for withdrawing catholyte 314. Cell 300 may comprise anodic inlet 340 for introducing or replenishing anolyte 334, and optionally also to introduce one or more hydrogen-containing species 342 to anodic chamber 331 (e.g. $H_2O$ as either liquid or vapour and/or $H_2$). Anolyte outlet 341 is provided for withdrawing anolyte 334, and anodic gas outlet 344 is provided for withdrawing gases 345 from the anodic chamber headspace.

In use, dinitrogen 318 is pressurised into cathodic chamber 311 via gas feed inlet 315. The partial pressure of dinitrogen in cathodic chamber 311 may be greater than 10 bar. Water may initially be present in anolyte 344 and/or fed to the anodic chamber via anodic inlet 340. A voltage is applied between the cathode and the anode sufficient to establish a reduction potential at cathode 310 which is below (more negative than) the $Li^+/Li$ reduction potential. The resulting flow of current through the cell results in the electrochemical reduction of the dinitrogen to ammonia in cathodic chamber 311 according to the principles disclosed herein.

In cell 300, differently from cell 200, water is oxidised at cathode 312 to produce protons in anolyte 334 according to equation (5). The protons migrate across membrane separator 333 to maintain charge neutrality in the cell, where they enter catholyte 314 and regenerate the cationic proton carrier by protonating the neutral proton acceptor. However, water and other undesirable species are excluded or inhibited from migrating from anolyte 334 to catholyte 314 by membrane separator 333.

The ammonia product may be removed continuously or periodically from cathodic chamber 311 in gas 319 via gas outlet 316 and/or in catholyte 314 withdrawn via electrolyte outlet 221. The cell may be operated continuously, and the electrolytes and gases withdrawn from the cell may be recycled, after removal of ammonia and other by-products, in similar manner as described for cell 200. Dihydrogen produced as a by-product in cathodic chamber 311 may be recovered and recycled to anodic chamber 331 for oxidation.

In a variation, dihydrogen may be introduced to cell 300 as the only hydrogen-containing species for oxidation at anode 312. In this case, both catholyte 314 and anolyte 334 may be substantially free of water.

The arrangement depicted in cell 300 is only one example of an electrochemical cell configured to allow oxidation of water at the cathode, and selective transmission of the resultant protons to a substantially water-free electrolyte for participation in water-sensitive cathodic reactions. In another reported approach, a separator is positioned in proximity to a porous anode (e.g. a gas diffusion electrode). A gas stream containing some water, e.g. humid air, is directed across the outside face of the anode, with the separator impeding convective mixing. The electrolyte is sufficiently hydrophobic that little water is absorbed from the gas stream. If the hydrophobicity of the electrolyte and the gas flow humidity are adequately tuned, the separator may not require proton-selective properties to maintain a low water content in the bulk electrolyte.

In another reported approach, a hydrophobic organic catholyte and polar (e.g. aqueous) anolyte are immiscible, and proton transfer takes place across the phase boundary between them. This arrangement may also allow satisfactory proton transfer while adequately inhibiting water transmission into the catholyte. To maintain a stable phase boundary a separator may be used as the location of the boundary.

Liquid Electrolyte, Use of the Electrolyte, and System Including the Electrolyte The present invention also relates to a liquid electrolyte for an electrochemical reduction reaction. The electrolyte comprises: (i) a neutral proton acceptor which is an ylide; (ii) a cationic proton carrier capable of reversible deprotonation to form the neutral proton acceptor; and (iii) a nonaqueous solvent. The liquid electrolyte is preferably substantially free of water. For example, it may contain less than 1000 ppm of water, preferably less than 100 ppm and most preferably less than 20 ppm of water.

The invention further relates to the use of this electrolyte for a reduction reaction in an electrochemical cell.

The cationic proton carrier, its corresponding neutral ylide proton acceptor, the electrochemically stable anions which charge-balance cationic species in the electrolyte, the concentrations of the aforementioned species, and the nonaqueous solvent(s) are generally as disclosed herein in the context of the methods of continuous electrochemical dinitrogen reduction to produce ammonia.

The inventors have recognised that an electrolyte including, in use, both the cationic proton donor and the ylide proton acceptor may provide advantages for a range of electrochemical reductions. Of particular interest are cathodic reductions requiring protons produced by anodic oxidation, but where: (a) direct reduction of protons or water to $H_2$ at the cathode competes with the desired reduction process, (b) nonaqueous conditions are desirable in the electrolyte, and/or (c) anionic organic intermediates in the reaction sequence are susceptible to precipitation, decomposition or other degradation pathways.

According to the principles disclosed herein, the cationic proton donor provides protons to the cathodic reduction reaction, while the corresponding ylide proton acceptor intercepts protons introduced to the electrolyte by anodic oxidation of a hydrogen containing species (suitably $H_2$ or $H_2O$) at the anode. It has been found that certain ylides, including phosphonium-carbanion ylides, are capable of repeated cycling between protonated and deprotonated forms without substantial degradation or precipitation, allowing high turn-over numbers to be achieved. Moreover, the presence of both species in the electrolyte buffers the overall reduction reaction, absorbing excess reaction intermediates (including protons) produced or accumulating during start up or online intermittency, and ensuring that a high proportion of the anodic protons are intercepted and consumed before they can participate in undesirable cathodic reactions such as the HER.

In some embodiments, the reduction reaction in the electrochemical cell is a continuous electrochemical dinitrogen reduction mediated by a metal selected from lithium, magnesium, calcium, strontium, barium, zinc, aluminium and vanadium, as detailed in the present disclosure. In such embodiments, the electrolyte may comprise these metal cations. However, it will be appreciated that the metal cations are a specific requirement of this particular reduction reaction, and that the metal cation component may accordingly be absent in other implementations.

The invention further relates to a system for continuous electrochemical reduction reactions. The system comprises an electrochemical cell comprising a cathode, an anode and a power supply to apply a voltage between the cathode and the anode; and a liquid electrolyte as described herein in contact with at least the cathode. The electrochemical cell may generally be as described in the context of the methods of continuous electrochemical dinitrogen reduction to produce ammonia.

EXAMPLES

The present invention is described with reference to the following examples. It is to be understood that the examples are illustrative of and not limiting to the invention described herein.

Materials and Methods

Tetrahydrofuran (THF) stabilised with butylated hydroxytoluene (BHT) was purchased from Chem-Supply. Prior to the electrolyte preparation the received THF was further dried over 4 Å molecular sieve for 24 h or until the detected water-content (by Karl-Fischer titration) is <5 ppm. $LiBF_4$, lithium trifluoromethanesulfonate (LiOTf) and lithium bis(trifluoromethanesulfonyl)imide (LiTFSl) were purchased from commercial suppliers including ACROS Organics ($LiBF_4$ 98% purity, anhydrous). Before use in electrolyte preparation the salt was further dried under vacuum at 120° C. for 12 h. The phosphonium and sulfonium salts trihexyl (tetradecyl) phosphonium tris(pentafluoroethyl) trifluorophosphate; ([$P_{666,14}$][eFAP]); tributyl(octyl) phosphonium tris(pentafluoroethyl) trifluorophosphate; ([$P_{444,8}$][eFAP]), triethyl(methyl) phosphonium tris(pentafluoroethyl) trifluorophosphate; ([$P_{1222}$][eFAP]) and trihexyl(tetradecyl) phosphonium perfluorohexanesulfonate ([$P_{666,14}$][PFHS]) and triethylsulfonium bis(trifluoromethanesulfonyl)imide ($Et_3S$-TFSl) were synthesized according to previously published methods.

Electrochemical measurements were carried out in a single compartment, 3-electrode configuration pressure cell with an internal volume of 75 mL. The typical amount of electrolyte used for each experiment was 5 mL. The working electrode (WE) used in the experiment was a Cu-disk electrode with a diameter of 1.25 mm. A Pt sheet counter electrode (CE, geometric surface area, GSA=1 $cm^2$) and an Ag quasi reference electrode (RE) separated in a glass frit were used. Before each experiment the WE was polished with a set of alumina slurry mixtures (0.3 μm and 0.05 μm) on an electrode polishing pad (Buehler). The polished WE was then rinsed with deionised (DI) water to remove residual alumina particles, and further polished on a clean polishing pad (without alumina) to achieve a pristine surface before further rinsing with acetone. For the CE, the electrode was torched with a butane flame until a bright red glow was observed and then rinsed with acetone. Following the cleaning treatments, all of the electrodes and the pressure cell components were dried under vacuum at 80° C. for a minimum of 4 hours. The electrochemical cell was then assembled and filled with the electrolyte inside an Ar-glovebox. The cell was then pressurised to the target pressure with ultra-high purity $N_2$ (99.999% purity) outside of the Ar-glovebox.

Electrochemical measurements are carried out with Biologic VMP XXX instrument. Chronoamperometric (CA) measurements were carried out following a sequence of electrochemical measurements. Following the cell pressurisation, electrochemical impedance spectroscopy (EIS) was carried out, followed by an open circuit potential (OCP) measurement until a stable potential reading is observed. Following the OCP, a cyclic voltametric experiment was carried out to determine the cross-over potential corresponding to the Li/$Li^+$ potential. This potential value was used as an internal standard to determine the applied working electrode (WE) potential (vs Li/$Li^+$) in the following CA experiment.

The ammonia produced during the CA experiments was measured by the Berthelot (indophenol blue) spectrophotometric measurements with internal standard addition methods, according to a procedure in ACS Energy Lett. 2020, 5, 736-741. Following an electrochemical measurement, the electrolyte was taken and diluted with 50 mM aqueous $H_2SO_4$. Subsequently, four 1.5 mL sample tubes were each filled with 100 μL aliquots of the diluted sample, 400 μL of deionised water and 400 μL internal standards (10, 20 and 50 μM) into the four different tubes to prepare four different calibration points. In addition, a tube containing 0.5 ml deionised water was also prepared as blank. Into each of the five tubes was added 0.4 mL of solution containing 1 M NaOH (with 5 wt. % salicylic acid and 5 wt. % sodium citrate), 100 μL of 10 vol. % NaClO solution and 30 μL of 1 wt. % $C_5FeN_6Na_2O$ (sodium nitroferricyanide). The mixture was then incubated for 2 hours for the colour to develop. Following the incubation, the five sample solutions were measured with UV-Vis spectrometer at the absorbance at 655 nm were taken and plotted to determine the amount of ammonia in the original electrolyte.

Example 1. Preparation of Electrolytes

In a typical electrolyte preparation, a 25 mL batch of electrolyte was prepared inside an Ar-glovebox to minimise the potential build-up of any possible contaminants. One electrolyte contained 0.2 M $LiBF_4$ and 0.1 M [$P_{666,14}$][eFAP] in THF. To prepare this electrolyte, 2.3±0.1 g of [$P_{666,14}$][eFAP] was added into a 25 mL volumetric flask, followed by the addition of 0.47±0.05 g of $LiBF_4$ into the flask, which then dissolved with THF to make up the 25 mL volume. The water content of the final electrolyte was further tested with Karl-Fischer titration; only batches exhibiting water content<20 ppm were used for electrochemical tests.

Similar electrolytes were prepared as follows:

- 0.2 M lithium triflate (LiOtf) and 0.1 M [$P_{666,14}$][eFAP] in THF;
- 0.2 M $LiBF_4$ and 0.1 M [$P_{444,8}$][eFAP] in THF;
- 0.2 M $LiBF_4$ and 0.1 M ([$P_{666,14}$][PFHS]) in THF;
- 0.2 M LiOTf/0.1 M [$P_{444,8}$]Cl in THF;
- 0.2 M $LiBF_4$/0.1 M [$P_{4444}$][$BF_4$] in THF;
- 2.0 M LiTFSI/0.1 M $Et_3S$-TFSI in THF;
- 0.2 M $LiBF_4$/0.1 M [$P_{4444}$][$BF_4$] in THF;
- 0.2 M LiOTf/0.1 M [$P_{666,14}$][eFAP] in dimethoxyethane (DME);
- 2.0 M LiTFSI/0.1 M [$P_{666,14}$][eFAP] in sulfolane
- 0.2 M LiOTf/0.1 M [$P_{666,14}$][TFSI]) in THF.

Example 2. Cyclic Voltammetry Studies

Cyclic voltammetry experiments were conducted initially to study the electrochemical properties of the phosphonium cation as a proton carrier, using the 0.2 M $LiBF_4$/0.1 M [$P_{666,14}$][eFAP]/THF electrolyte to analyse the compatibility of the molecule with the Li-electrochemistry. Comparison was made to a typical electrolyte used in prior reported continuous Li-mediated electrochemical systems, consisting of 0.2 M of LiOtf/0.17 M ethanol in THF. The cyclic voltammetry experiments were conducted under varied $N_2$ pressure up to 20 bar.

Figure 4:
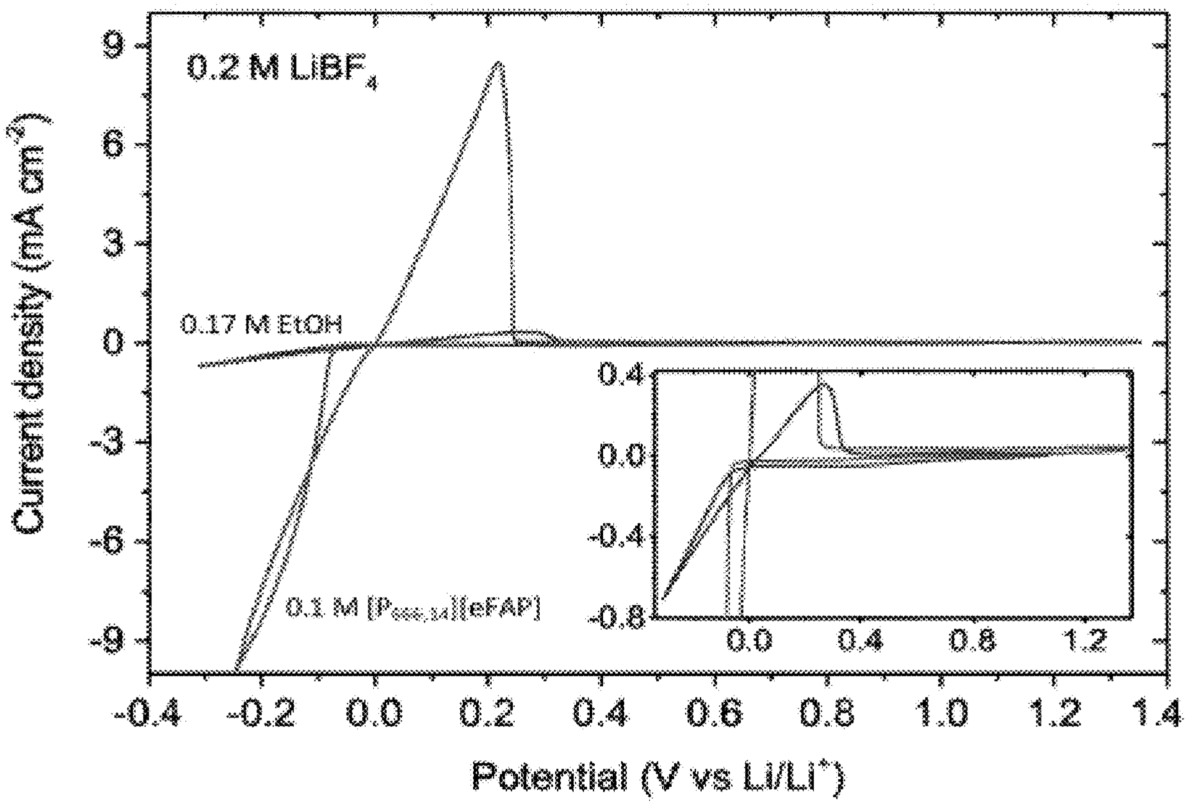
FIG. 4 shows cyclic voltammetry results obtained in Example 2 for an electrolyte comprising 0.2 M $LiBF_4$ and 0.1 M $[P_{666,14}]$[eFAP] in tetrahydrofuran (THF), conducted under $N_2$ pressure, with comparison against an electrolyte comprising 0.2 M $LiBF_4$ and 0.17 M ethanol in THF.

Shown in FIG. 4 are the cyclic voltammetry results for both proton carrier systems. It is evident that the presence of [$P_{666,14}$][eFAP] does not interfere with the Li electrochemistry. Instead [$P_{666,14}$][eFAP], which is itself a salt, enhanced the ionic conductivity of the electrolyte. As a result, significantly higher electrochemical reaction rates can be inferred from the higher current densities. For example, the current at the Li oxidation peak at 0.22 V vs Li/$Li^+$ in the [$P_{666,14}$][eFAP] containing system is observed to be 8.5 mA $cm^{-2}$; this value is 24 times higher than that observed in the standard ethanol system (0.35 mA $cm^{-2}$).

Example 3. Chronoamperometric (CA) Ammonia Production

Figure 5:
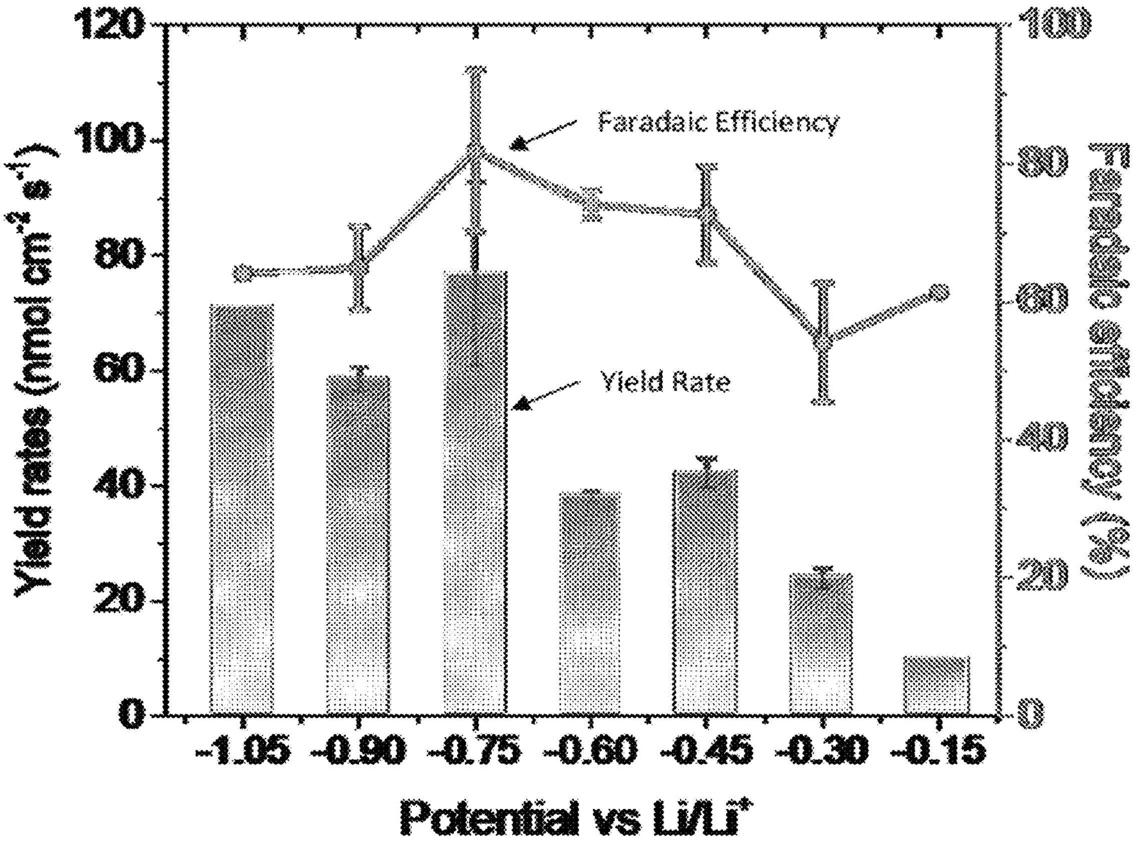
FIG. 5 is a graph of ammonia yield rate and faradaic efficiency obtained in Example 3 in a series of chronoamperometric electrochemical experiments with an electrolyte comprising 0.2 M $LiBF_4$ and 0.1 M $[P_{666,14}]$[eFAP] in THF, conducted under $N_2$ pressure in the range of −0.15 V to −1.05 V vs $Li/Li^+$.

To further evaluate the ability of the phosphonium cation/phosphonium ylide system as a proton carrier in the lithium-mediated reduction of dinitrogen to produce ammonia, a series of CA experiments were performed using the 0.2 M $LiBF_4$/0.1 M [$P_{666,14}$][eFAP]/THF electrolyte with an applied potential in the range of −0.15 V to −1.05 V vs Li/$Li^+$. The experiments were conducted for 2 hours under 20 bar of $N_2$. No hydrogen was introduced into the cell in order to avoid any contribution from $H_2$ reduction to LiH in the cathodic process. In the absence of $H_2$, the proton-forming anode reaction is the oxidation of THF. The results shown in FIG. 5 demonstrate the successful formation of ammonia at high faradaic efficiency (FE). The maximum FE of 82±12% for ammonia production was achieved at an applied potential of −0.75 V vs Li/$Li^+$. At this potential, an ammonia yield rate of 77±16 nmol $cm^{-2}$ $s^{-1}$ was obtained. Within the tested potential range, the ammonia production yield rate is observed to increase with increased applied overpotential. The error bars at −0.75 V reflect the standard deviation of the results with n=4 (four repeat experiments) while the other error bars reflect the standard deviation with n=2.

Example 4. Chronopotentiometric Cell Stability Testing

Figure 6:
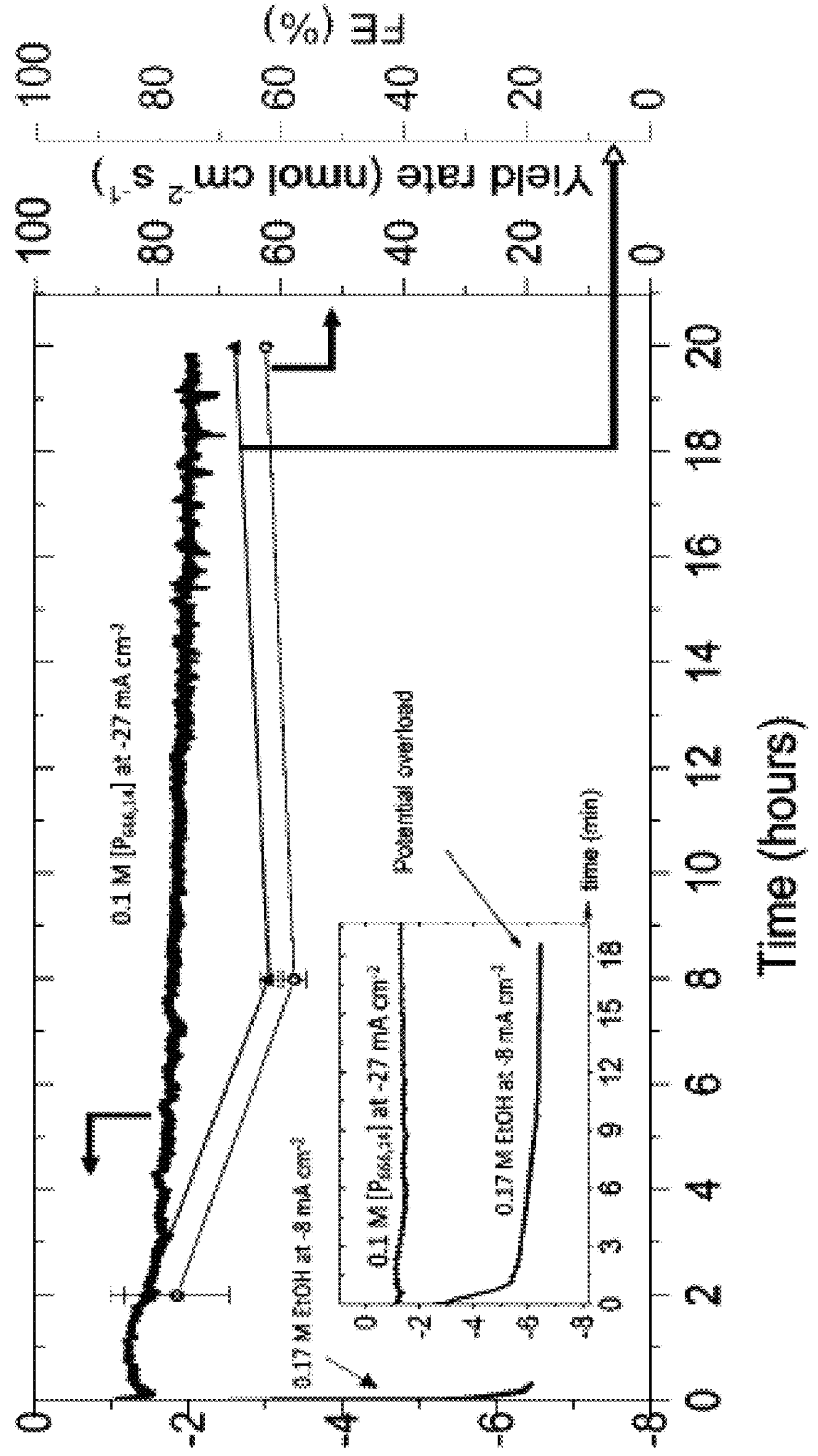
FIG. 6 shows cell stability results obtained in Example 4 in a chronopotentiometric electrochemical experiment using an electrolyte comprising 0.2 M Li triflate (LiOTf) and 0.1 M $[P_{666,14}]$[eFAP] in THF, conducted under $N_2$ and $H_2$ pressure at a constant applied current of 4 mA $cm^{-2}$, with comparison against an electrolyte comprising 0.2 M LiOTf and 0.17 M ethanol in THF.

The cathode potential stability of the cationic phosphonium proton carrier system was compared to the ethanol proton carrier system in chronopotentiometric (CP) experiments. The 0.2 M Li triflate (LiOTf)/0.1 M [$P_{666,14}$][eFAP]/THF electrolyte was thus compared against 0.2 M Li triflate (LiOTf)/0.17 M ethanol/THF at a constant applied current of 27 mA $cm^{-2}$ in each case. The experiments were conducted under 19.5 bar of $N_2$ and 0.5 bar $H_2$ in the phosphonium case and 20 bar $N_2$ in the ethanol case (the result in the latter case is the same with and without $H_2$). The results are shown in FIG. 6 where the inset is a magnification of the initial minutes of the experiment. The results show that the ethanol-based system suffers from an immediate increase of the required cathode voltage from the start of the CP experiment. Within just 20 minutes the working electrode potential surpassed −6 V vs $Li/Li^+$ leading to potential overload of the electrochemical system. In contrast, the phosphonium-based proton carrier system exhibited significantly higher stability, providing an extended voltage stability over 20 hours. The cathode potential of the phosphonium proton carrier remained below −2 V vs $Li/Li^+$ for the duration of the experiment. This also produces a higher energy efficiency in the phosphonium proton carrier system.

Over the entire 20-hour experiment, a FE of 40% was achieved with a yield rate of 5.5 nmol $cm^{-2}$ $s^{-1}$. In a similar experiment of only 1.5 hours, a FE of 67% and yield rate of 9.0 nmol $cm^{-2}$ $s^{-1}$ was achieved. It is proposed that the degradation in performance after 6 hours may be attributed at least in part to decomposition of the THF solvent.

The working electrode (WE) was inspected after each CP experiments. After the 20-hour experiment with the phosphonium proton carrier system, the Cu surface remained shiny. By contrast, strongly adhered white deposits are observed to have formed on the WE surface after only an 8-hour experiment with the ethanol proton carrier system. It is believed that this material may have formed due to the insolubility and/or instability of deprotonated carrier (i.e. EtOLi), with build-up of the insoluble material causing progressive passivation of the WE. This is consistent with previous proposals that the increase in cell potential during operation of the Li-mediated ammonia synthesis is a result of the decomposition of the alcohol electrolyte component.

Example 5. Ylide Regeneration Investigations

Figure 7:
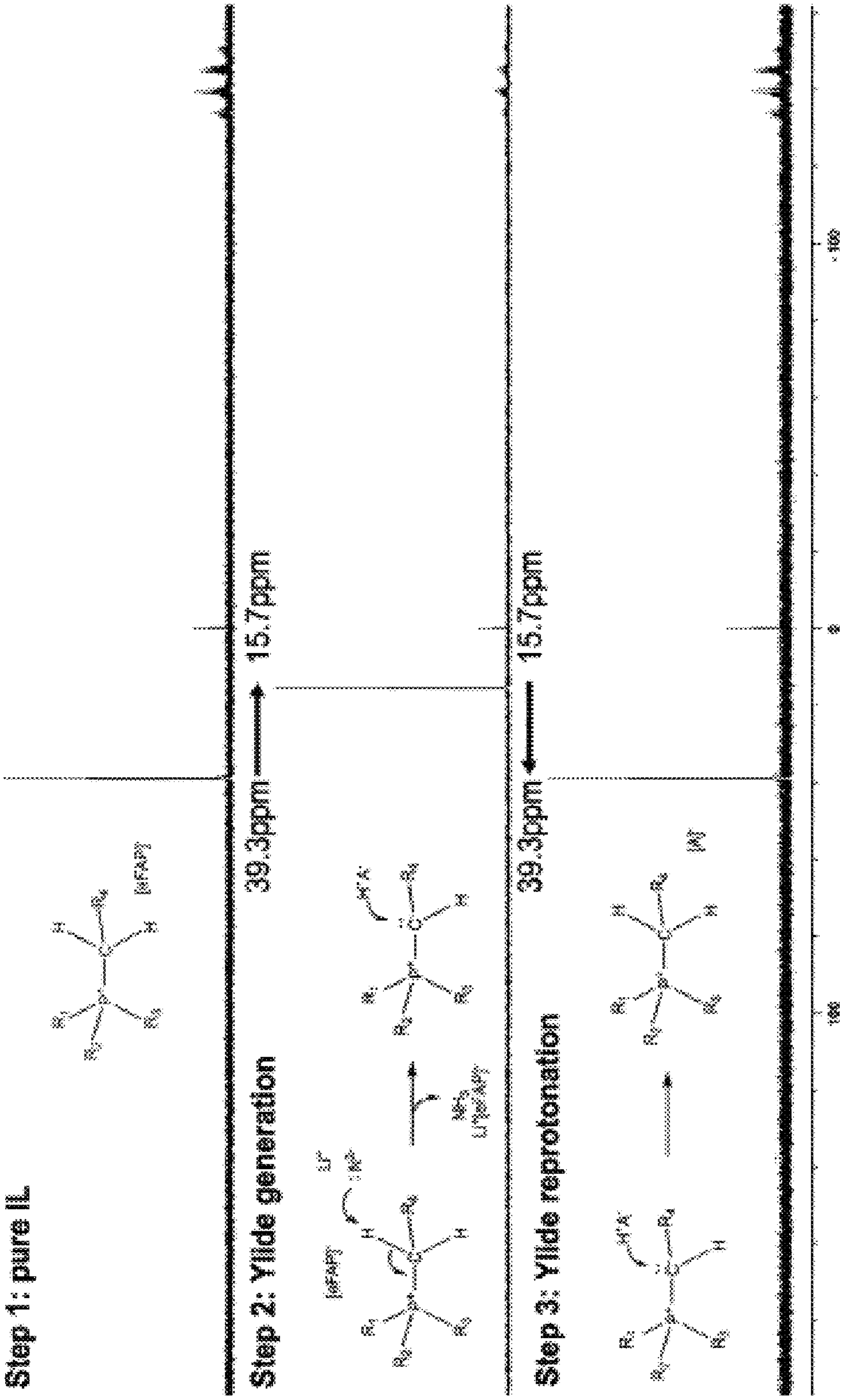
FIG. 7 shows a series of $^{31}P$ NMR spectra obtained in Example 5, demonstrating the reversible deprotonation of the $[P_{666,14}]$+ cation in a 0.2 M solution of $[P_{666,14}]$[eFAP] in THF, by sequential deprotonation with lithium nitride and re-protonation reaction by a weak acid.

To investigate the role of alkyl phosphonium species as a regenerable proton carrier during the electrochemical Li-mediated ammonia synthesis, a series of experiments were performed with $[P_{666,14}]$[eFAP] and monitored by $^{31}P$ NMR spectroscopy as depicted in FIG. 7. All reactions were carried out using dried materials in inert atmosphere in the argon glovebox ($O_2$ and $H_2O$<0.5 ppm). $^{31}P$-NMR spectra were recorded in THF, using external capillary with $PPh_3$ as a reference, according to which axis was calibrated at 0 ppm.

In the first step, a 0.2 M solution of $[P_{666,14}]$[eFAP] in THF was prepared and the $^{31}P$ NMR spectrum was recorded. As seen in FIG. 7, the spectrum features one $^{31}P$ NMR signal corresponding to the phosphonium cation $[P_{666,14}]$ at 39.3 ppm and a group of signals between −131 and −151 ppm corresponding to the [eFAP] anion. In the second step an excess of $Li_3N$ was added to the 0.2 M solution of $[P_{666,14}]$[eFAP] and the mixture was stirred for 24 h. Visually, no changes of the mixture were observed: it remained colourless, transparent and without any visible precipitates. The $^{31}P$ NMR spectrum recorded after 24 hours (middle spectrum in FIG. 7) shows that the peak at 39.3 ppm had fully disappeared and a new peak appeared at 15.7 ppm. This peak corresponds to a zwitterionic species formed in near-quantitative yield via deprotonation of the phosphonium cation by reaction with $Li_3N$. The NMR data is consistent with the formation of a phosphonium ylide. In the third step, 0.2 ml of a 0.1 M solution of acetic acid was added to 0.5 ml of the ylide-containing solution and the $^{31}P$ NMR spectrum was recorded (bottom spectrum in FIG. 7). The spectrum shows quantitative recovery of the phosphonium cation (peak at 39.3 ppm).

The recovery of the phosphonium cation was confirmed using mass spectroscopy (MS): the mass spectra from stage 1 and stage 3 were identical, showing only one signal (m/z=483) corresponding to the $[P_{666,14}]$ cation.

This stepwise reaction process was repeated for other phosphonium salts as follows: $[P_{1222}]$[eFAP], $[P_{4448}]$[eFAP] and triphenylmethyl phosphonium tetrafluoroborate ($[PPh_3Me][BF_4]$). All $^{31}P$-NMR spectra showed generation of the ylide species when reacted with $Li_3N$ and then regeneration of the phosphonium cation after the addition of acetic acid. This demonstrates that a range of alkyl phosphonium cations are suitable cationic proton carriers, and that the stepwise reaction test can be used as a screening method for potential proton carriers.

Example 6. Evaluation of Other Alkyl Phosphonium Salts

Other alkyl phosphonium salts were evaluated in a series of CA experiments using (a) the 0.2 M $LiBF_4$/0.1 M $[P_{444,8}]$[eFAP]/THF electrolyte, (b) the 0.2 M $LiBF_4$/0.1 M $[P_{666,14}]$[PFHS]/THF electrolyte, or (c) 0.2 M LiOTf/0.1 M $[P_{666,14}]$Cl/THF electrolyte, each with an applied potential of −0.45 V vs $Li/Li^+$ for eight hours; and (d) the 0.2 M $LiBF_4$/0.1 M $[P_{4444}][BF_4]$/THF electrolyte and e) the 0.2 M LiOTf/0.1 M $[P_{666,14}]$[TFSI]/THF electrolyte, each with an applied potential of −0.75V vs $Li/Li^+$ for two hours. The experiments were conducted under 20 bar of $N_2$ (no $H_2$). The results are shown in Table 1 below.

TABLE 1

| Phosphonium Salt | Applied E (vs $Li/Li^+$) | Yield rate (nmol $cm^{-2}$ $s^{-1}$) | FE (%) |
|---|---|---|---|
| $[P_{444,8}]$[eFAP] | −0.45 | 31.8 | 66.4 |
| $[P_{666,14}]$[PFHS] | −0.45 | 9.8 | 51.3 |
| $[P_{666,14}]$CI | −0.45 | 2.5 | 23 |
| $[P_{444,4}][BF_4]$ | −0.75 | 8.5 | 33.9 |
| ($[PPh_3Me][BF_4]$ | −0.75 | 0.3 | 7.5 |
| $[P_{666,14}]$[TFSI] | −0.75 | 35.1 | 66.9 |

The productivity and selectivity obtained with $[P_{444,8}]$[eFAP] are comparable to that with the $[P_{666,14}]$[eFAP] proton carrier at the same potential (see Example 3), indicating that a variety of alkyl phosphonium structures are suitable. Excellent performance was obtained with $[P_{666,14}]$[TFSI], but somewhat lower productivity was obtained with $[P_{666,14}]$[PFHS] and $[P_{666,14}]$Cl which is believed to be due to the lower conductivity of electrolytes containing these salts. The results nevertheless demonstrate the suitability of a range of electrochemically stable counterions. Chloride in this context is sufficiently stable to be used with an $H_2$ anode reaction.

Example 7. Evaluation of $H_2$ as the Anodically Oxidised Hydrogen-Containing Species The use of $H_2$ as the source of protons to the electrolyte in a continuous ammonia synthesis, CA experiments were performed using the 0.2 M $LiBF_4$/0.1 M $[P_{666,14}]$[eFAP]/THF electrolyte at an applied potential of −0.45 V vs $Li/Li^+$. Hydrogen gas ($H_2$) was thus supplied to the pressurised electrochemical cell. Four measurements under a total cell pressure of 20 bar, consisting of 15 bar $N_2$ and 5 bar $H_2$, were carried out. An average $NH_3$ yield rate of $22\pm11$ nmol $cm^{-2}$ $s^{-1}$ at a Faradaic efficiency (FE) of $65\pm22\%$ was obtained.

Example 8. Control Experiment Using Ar Instead of $N_2$

To prove that the produced $NH_3$ in examples 2 to 7 originated from the supplied $N_2$ gas, a CA experiment was carried out under 20 bar Ar pressure using the 0.2 M $LiBF_4$/0.1 M $[P_{666,14}][eFAP]$/THF electrolyte at an applied potential of $-0.45$ V vs $Li/Li^+$. A total of only 6 nmol of $NH_3$ was detected after passing 2.5 C of charge. This contrasts against 3479 nmols (1.5 C of charge was passed) detected in an equivalent experiment under $N_2$, demonstrating that the produced $NH_3$ originated from the electrochemical reduction of $N_2$.

Example 9. Effect of $N_2$ Pressure

Figure 8:
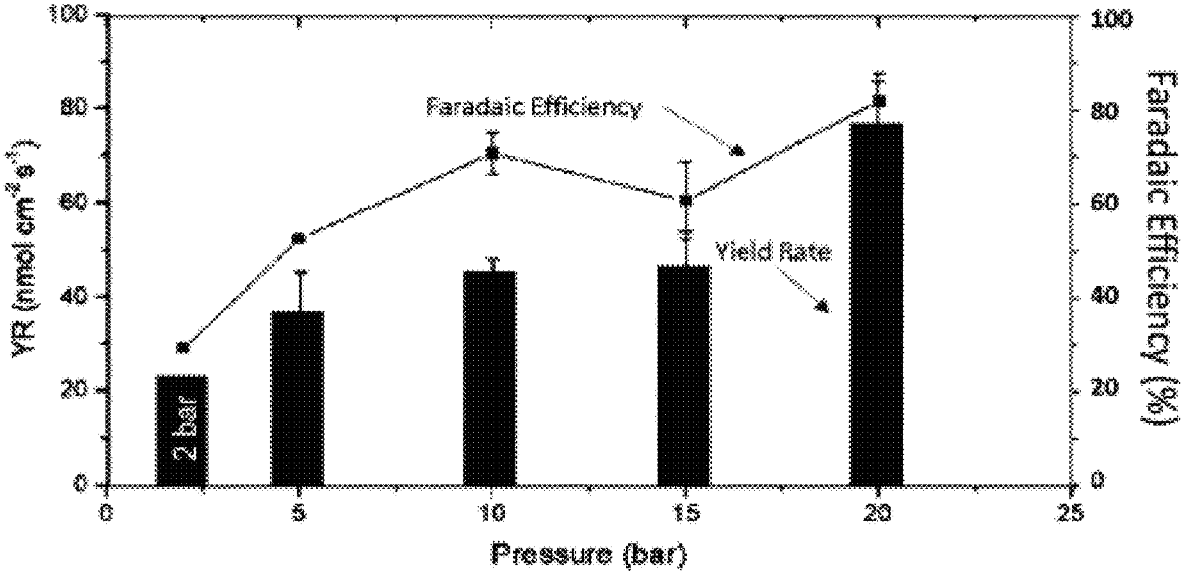
FIG. 8 is a graph of ammonia yield rate and faradaic efficiency obtained in Example 9 in a series of chronoamperometric electrochemical experiments with an electrolyte comprising 0.2 M $LiBF_4$ and 0.1 M $[P_{666,14}]$[eFAP] in THF, conducted at −0.75 V vs Li/$Li^+$ under $N_2$ pressures in the range of 2 to 20 bar.

To investigate the effect of $N_2$ pressure, a series of CA experiments were performed using the 0.2 M $LiBF_4$/0.1 M $[P_{666,14}][eFAP]$/THF electrolyte at an applied potential of $-0.75$ V vs $Li/Li^+$. The experiments were conducted for 2 hours at $N_2$ pressures in the range of 2 to 20 bar. The results shown in FIG. 8 demonstrate the improved yield rate and faradaic efficiency at higher pressures.

Example 10. Evaluation of Other Solvents

Due to the undesired polymerisation of THF by electrodeposited Li, a solubility study was conducted to identify other nonaqueous solvents potentially suitable for Li-mediated ammonia electrosynthesis. Solubility was evaluated at a concentration of 0.2 M salt in the specified solvent. The results are shown in Table 2.

TABLE 2

| | DME | FPEE | HFCP | TFT | HFCP/DME* | TFT/DME# |
|---|---|---|---|---|---|---|
| LiOTf | Soluble | Low solubility | Insoluble | Insoluble | Soluble | Soluble |
| LiTFSI | Soluble | Soluble | Insoluble | Insoluble | Soluble | — |
| $[P_{666,14}][eFAP]$ | Soluble | Insoluble | Soluble | Soluble | Soluble | soluble |

LiTFSI: lithium bis(trifluoromethanesulfonyl)imide; DME: dimethoxyethane; FPEE: 1H,1H,5H-octafluoropentyl-1,1,2,2-tetrafluoroethyl ether; HFCP: 1H,1H,2H-heptafluorocyclopentane; TFT: Trifluorotoluene.
*350 uL of DME added to a 5 mL mixture of 0.1M $[P_{666,14}][eFAP]$, 0.2M salt in HFCP
#375 uL of DME is required to dissolve 0.2M LiOtf in a 5 mL mixture of 0.1M $[P_{666,14}][eFAP]$ in TFT Dimethoxyethane (DME) was then evaluated as a solvent in a CA experiment using the 0.2 M LiOTf/0.1 M $[P_{666,14}]$ $[eFAP]$/DME electrolyte with an applied potential of $-0.45$ V vs $Li/Li^+$. The experiment was conducted for 1.3 hours under 20 bar of $N_2$. The result is shown in Table 3 below.

Sulfolane was also evaluated as a solvent in a CA experiment using 2.0 M LiTFSI/0.1 M $[P_{666,14}][eFAP]$/sulfolane electrolyte with an applied potential of $-0.25$ V vs $Li/Li^+$. The experiment was conducted for 2 hours under 20 bar of $N_2$ and at $60°$ C. The result is shown in Table 3 below.

TABLE 3

| Phosphonium Salt | Solvent | Applied E (vs $Li/Li^+$) | Yield rate (nmol $cm^{-2}$ $s^{-1}$) | FE (%) |
|---|---|---|---|---|
| $[P_{666,14}][eFAP]$ | DME | $-0.45$ | 2.25 | 16 |
| $[P_{666,14}][eFAP]$ | sulfolane | $-0.25$ | 0.91 | 5 |

Example 11. Evaluation of Alkyl Sulfonium Salt as Cationic Proton Carrier

Alkyl sulfonium salts were evaluated in a series of CA experiments using an electrolyte comprising 2 M lithium bis(trifluoromethylsulfonyl)imide (LiTFSI) and 0.1 M triethylsulfonium bis(trifluoromethanesulfonyl)imide ($Et_3S$-TFSI) in THF in a single compartment cell with a nickel wire cathode (0.15 $cm^2$ surface area) at an applied potential of $-0.55$ V vs $Li/Li^+$. The experiment was conducted for 6 hours under 15 bar of $N_2$ (no $H_2$), with the electrolyte stirred at 600 rpm. A $NH_3$ yield rate of 71 nmol $s^{-1}$ $cm^{-2}$ and faradaic efficiency of 30% was obtained.

These results are comparable to those with the $[P_{666,14}]$ $[eFAP]$ proton carrier at the same potential (see Example 3). The result demonstrates the suitability of sulfonium type cations as proton carriers in Li-mediated NRR.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A method of continuous electrochemical dinitrogen reduction to produce ammonia, the method comprising:
   supplying dinitrogen to an electrochemical cell comprising an electrolyte in contact with at least a cathode;
   introducing protons to the electrolyte by anodic oxidation of a hydrogen-containing species; and
   cathodically reducing the dinitrogen in the presence of a metal selected from lithium, magnesium, calcium, strontium, barium, zinc, aluminium and vanadium to produce ammonia,
   wherein the electrolyte comprises a cationic proton carrier capable of reversible deprotonation to form a neutral proton acceptor,
   wherein the neutral proton acceptor is an ylide, and
   wherein the cathodically reducing the dinitrogen comprises reacting the dinitrogen and the cationic proton carrier to produce ammonia and to form the neutral proton acceptor.

2. The method according to claim 1, wherein the cationic proton carrier is regenerated in the electrolyte by protonating the neutral proton acceptor with the protons.

3. The method according to claim 1, wherein reacting the dinitrogen and the cationic proton carrier comprises (i) reacting the dinitrogen and the metal to form a metal nitride; and (ii) reacting the metal nitride with the cationic proton carrier to produce the ammonia and form the neutral proton acceptor.

4. The method according to claim 1, wherein the metal is present as metal cations in the electrolyte.

5. The method according to claim 1, wherein the metal is lithium.

6. The method according to claim 1, wherein the ylide comprises a carbanion adjacent to a cationic heteroatom selected from the group consisting of phosphorous, nitrogen, sulfur and oxygen.

7. The method according to claim 1, wherein the neutral proton acceptor is selected from a phosphonium ylide and a sulfonium ylide.

8. The method according to claim 1, wherein the cationic proton carrier is selected from an alkyl phosphonium cation and an alkyl sulfonium cation.

9. The method according to claim 1, wherein the cationic proton carrier is a tetra-alkyl phosphonium cation.

10. The method according to claim 1, wherein the electrolyte is a nonaqueous liquid electrolyte.

11. The method according to claim 10, wherein the nonaqueous liquid electrolyte comprises one or more molecular solvents selected from the group consisting of ethers, methylated polyethers, methylated glycol ethers, fluorinated ethers, fluorinated alkyls, fluorinated cycloalkyls, carbonates, sulfolane and dimethylsulfoxide.

12. The method according to claim 1, wherein the cationic proton carrier is charge balanced in the electrolyte by one or more electrochemically stable anions selected from the group consisting of tetrafluoroborate, hexafluorophosphate, chloride, perchlorate, fluoroalkyl phosphates, fluoroaryl borates, fluoroalkyl borates, fluorinated bis(sulfonyl) imides, and fluorinated sulfonates.

13. The method according to claim 1, wherein the cationic proton carrier and the neutral proton acceptor are present in the electrolyte in a combined concentration of greater than 0.001 mol/L.

14. The method according to claim 1, wherein the hydrogen-containing species is selected from dihydrogen and water.

15. The method according to claim 1, wherein the cathode has a potential, when cathodically reducing the dinitrogen, of below (more negative than) than the apparent reduction potential of cations of the metal in the non-aqueous electrolyte under dinitrogen reduction conditions, as measured by the crossover point in cyclic voltammetry.

16. The method according to claim 1, wherein the metal is lithium, wherein lithium cations are present in the electrolyte, and wherein the cathode has a potential sufficiently negative that lithium cations are reduced when cathodically reducing the dinitrogen.

17. The method according to claim 1, wherein the metal is lithium and wherein lithium cations are dissolved in the electrolyte in a concentration of greater than 0.1 mol/L.

18. A method of continuous electrochemical dinitrogen reduction to produce ammonia, the method comprising:

supplying dinitrogen to an electrochemical cell comprising an electrolyte in contact with at least a cathode;

introducing protons to the electrolyte by anodic oxidation of a hydrogen-containing species; and cathodically reducing the dinitrogen in the presence of a metal selected from lithium, magnesium, calcium, strontium, barium, zinc, aluminium and vanadium to produce ammonia, wherein the electrolyte comprises at least one cationic proton donor selected from an alkyl phosphonium cation and an alkyl sulfonium cation, and wherein the cathodically reducing the dinitrogen to produce ammonia comprises deprotonating the cationic proton donor to form an ylide.

* * * * *